US006108906A

United States Patent [19]

Fujita et al.

[11] Patent Number: 6,108,906

[45] Date of Patent: Aug. 29, 2000

[54] FIXING DEVICE FOR AN IMAGE FORMING APPARATUS AND FIXING ROLLER FOR THE SAME

[75] Inventors: Takashi Fujita, Wako; Hiroshi Wada, Fujisawa; Shigeharu Nakamura, Atsugi, all of Japan

[73] Assignee: Ricoh Company, Ltd., Tokyo, Japan

[21] Appl. No.: 09/383,355

[22] Filed: Aug. 26, 1999

Related U.S. Application Data

[62] Division of application No. 08/800,461, Feb. 14, 1997.

[30] Foreign Application Priority Data

| | | | |
|---|---|---|---|
| Feb. 16, 1996 | [JP] | Japan | 8-29527 |
| Mar. 8, 1996 | [JP] | Japan | 8-51765 |
| May 31, 1996 | [JP] | Japan | 8-139286 |
| Nov. 1, 1996 | [JP] | Japan | 8-292010 |

[51] Int. Cl.[7] .......... B23P 17/00

[52] U.S. Cl. .......... 29/895.211; 492/49; 492/51; 399/330; 399/333

[58] Field of Search .......... 29/895, 895.211, 29/895.212, 895.23, 895.2, 895.21; 399/333, 330, 328, 320; 219/216, 469, 50, 59.1; 118/60; 347/156; 492/49, 51, 52, 53

[56] References Cited

U.S. PATENT DOCUMENTS

| | | | |
|---|---|---|---|
| 4,745,431 | 5/1988 | Kogure et al. | 399/69 |
| 4,796,046 | 1/1989 | Suzuki et al. | 399/331 |
| 5,334,124 | 8/1994 | Ohno | 492/50 |
| 5,655,196 | 8/1997 | Litman et al. | 399/276 |
| 5,722,025 | 2/1998 | Morigami et al. | 399/330 |
| 5,906,762 | 5/1999 | Okabayashi | 219/216 |
| 5,932,125 | 8/1999 | Kawata et al. | 219/216 |

FOREIGN PATENT DOCUMENTS

| | | |
|---|---|---|
| 5-278141 | 10/1993 | Japan . |
| 6-332333 | 12/1994 | Japan . |
| 7-49630 | 2/1995 | Japan . |
| 7-140824 | 6/1995 | Japan . |
| 7-160136 | 6/1995 | Japan . |
| 7-210024 | 8/1995 | Japan . |
| 7-219386 | 8/1995 | Japan . |

*Primary Examiner*—David P. Bryant
*Assistant Examiner*—Marc W. Butler
*Attorney, Agent, or Firm*—Oblon, Spivak, McClelland, Maier & Neustadt, P.C.

[57] ABSTRACT

In a fixing device for an image forming apparatus, a heat roller includes a hollow cylindrical base, a heating layer formed of strip-like fibers implementing desired power consumption, and a parting layer provided on the outer periphery of the heating layer with the intermediary of an electrical insulating layer. The strip-like fibers of the heating layer are wound on the base and provided with a preselected resistance.

14 Claims, 23 Drawing Sheets

FIXING DEVICE FOR AN IMAGE FORMING APPARATUS AND FIXING ROLLER FOR THE SAME

This application is a division of Ser. No. 08/800,461 filed Feb. 14, 1997.

BACKGROUND OF THE INVENTION

1. Field of the Invention

The present invention relates to a fixing device for use in an electrophotographic apparatus, copier, facsimile apparatus or similar image forming apparatus, and a heat roller for the fixing device. More particularly, the present invention is concerned with a fixing device exhibiting a uniform temperature distribution, saving power, resistive to deflection and collapse, and safely operable, and a method of producing a heat roller for the same.

2. Discussion of the Background

An image forming apparatus of the kind described has a fixing device in which a press roller is held in pressing contact with a heat roller. While the heat roller heated is in rotation, the roller nips a sheet carrying toner thereon between it and the press roller. As a result, the toner is melted and fixed on the sheet. The current trend in the imaging art is toward an image forming apparatus with a power saving configuration. To save power, it is desirable that a heater accommodated in the heat roller be turned on only when the fixing device is used. In addition, the heat roller should be rapidly heated in order to reduce a period of time necessary for the roller to reach a preselected heating temperature, i.e., temperature elevation time.

One of traditional heat rollers accommodates a heat source in the form of a halogen lamp therein so as to be heated indirectly thereby. This kind of heat roller is formed of, e.g., aluminum and has a wall thickness of 1.5 mm to 3.0 mm, so that the surface temperature of the roller may not noticeably vary even during continuous operation. A problem with such an indirect heating type of heat roller is that the heat source cannot beat the roller to the fixing temperature in a short period of time. Another problem is that the heat roller cannot be held at the fixing temperature without increasing power consumption.

On the other hand, heat rollers to be directly heated by their heat sources are taught in, e.g., Japanese Patent Laid-Open Publication Nos. 7-140824 and 6-332333. However, even the direct heating type of heat roller is disadvantageous in that only a limited range of materials are applicable to the roller, in that there is a fear of fire ascribable to unusual temperature elevation, in that the roller is apt to bend with respect to the axis thereof or to collapse in the radial direction, and in that the roller is not durable.

The fixing device should preferably be operable with a commercial power source (100 V or 200 V) from the cost standpoint. With a conventional heating body implemented by a resistance body, it is possible to set a necessary amount of heat by adjusting the source voltage via a transformer. However, several hundred watts of power necessary for the fixing device of electrophotography is not achievable without increasing the size, weight and cost of the apparatus.

Two different approaches are available for solving the above problem. First, the resistance may be adjusted on the basis of the thickness of the resistance body. The kind of approach, however, needs high precision as to film thickness. Silk printing and other various application methods are substitutes for the above approach. Second, the resistance may be adjusted on the basis of the length of the resistance body, i.e., by using a particular wiring pattern. The problem with this approach is that because heat is generated along the wiring pattern, it is difficult to cause the heating body to heat uniformly over its entire surface. Moreover, when the heating body and the base of the heat roller are formed of ceramics or sintered body whose thermal conductively is low, the amount of heat is irregular unless irregularities in the thickness and resistance of the heating body or layer are reduced.

Assume that the heat roller is constituted by a pipe of ceramics, glass or similar material having low thermal conductivity. Then, even if a heating body capable of heating evenly is obtained, it is impracticable to correct rapidly a temperature difference between a portion of the heat roller where a sheet carrying toner thereon passes and a portion where it does not pass. As a result, the temperature distribution on the surface of the heat roller is conspicuous. Such an occurrence can be improved to a noticeable degree if a heating layer is formed in a metallic base having high thermal conductivity with the intermediary of an insulating layer.

A heat roller capable of setting up a uniform temperature distribution in its axial direction is disclosed in Japanese Patent Laid-Open Publication No. 5-278141 and implemented as a heating pipe. The heating pipe is a laminate consisting of a conductive layer in the form of a carbon fiber blade, an electrical insulating layer in the form of, e.g., unwoven cloth, and a layer of polyether imide fibers. To produce the heating pipe, the carbon fiber blade is arranged on a mandrel (cylindrical rod). Then, the unwoven cloth is wound round the blade. Further, the polyether imide fiber layer is interposed between the blade and the unwoven cloth. Electrodes are formed between the blade and the mandrel. Subsequently, the entire assembly is inserted into a pipe formed of, e.g., aluminum and then heated in order to connect the laminate and aluminum pipe. Finally, the mandrel is pulled out of the aluminum pipe.

In the heating pipe, the conductive layer consisting of the carbon fibers and insulating layer are formed on the inner periphery of the aluminum or similar metallic pipe and then affixed to the pipe by a thermoplastic polymer. Laid-Open Publication No. 5-278141 does not teach how the resistance of the carbon fibers is adjusted at all. It is therefore extremely difficult to set the resistance of the carbon fibers when it comes to an actual heating body. If the resistance of the carbon fibers cannot be adjusted for setting up desired power to be consumed by the heating body, then the source voltage for applying a voltage to the heating body must be varied. This cannot be done without resorting to an expensive power source device.

Another problem with the heating pipe is that the heating body is positioned inside of the metallic pipe, increasing the temperature elevation time. To reduce the temperature elevation time, the metallic pipe must be provided with a wall thickness as small as, e.g., 0.4 mm or below. However, the amount of heat generated by the heating body is irregular so far as the disclosure indicates. The irregular heat directly translates into irregular surface temperature on the heat roller, obstructing sufficient fixation of toner on a sheet.

Further, Laid-Open Publication No. 5-278141 does not teach whether or not the heating pipe can implement a heat roller capable of setting up a uniform temperature distribution. Presumably, therefore, it is difficult to use the heating pipe as a heat roller. In addition, it appears that an expensive power source device is indispensable in order to adjust the voltage to be applied to the heating body, as stated earlier.

Moreover, the heating layer is not formed on the outer periphery of the metallic pipe, but formed on the inner periphery of the same. Assume that PFA (perfluoroalcoxy resin), PTFE (polytetrafluoroethylene resin) or similar fluorine-contained resin is applied or otherwise provided on the surface of the pipe in order to form a parting layer, and then heated at 350° C. or above. Then, the heat-resistance thermoplastic resin bonding the laminate (heating body) affixed in the pipe melts and comes off the pipe.

SUMMARY OF THE INVENTION

It is therefore an object of the present invention to provide a fixing device for an image forming apparatus and capable of elevating temperature rapidly and setting up a uniform temperature distribution, and a heat roller for the same.

It is another object of the present invention to provide a fixing device for an image forming apparatus and capable of reducing power consumption, and a heat roller for the same.

It is another object of the present invention to provide a fixing device for an image forming apparatus and insuring safety operation, and a heat roller for the same.

It is another object of the present invention to provide a fixing device for an image forming apparatus and resistive to deflection and collapse and highly durable, and a heat roller for the same.

It is another object of the present invention to provide a method of producing a heat roller for a fixing device included in an image forming apparatus.

In accordance with the present invention, a heat roller using a direct heating system has a hollow cylindrical base, a parting layer, and a heating layer comprising a heating body constituted by strip-like fibers. The heating body extends linearly or helically. The resistance R of said heating body and the heating area W·L of the heating layer for implementing desired power consumption are expressed as:

$$R=Rs\cdot L/W$$

$$W\cdot L=2\pi Rl$$

Rs, L and W respectively denote the surface resistance, length and width of the heating body, π denotes the ratio of the circumference of a circle to a diameter, r denotes the radius of the heating layer, and l denotes the length of the heating layer in the axial direction of the heat roller.

Also, in accordance with the present invention, a heat roller using a direct heating system has a hollow cylindrical base, a parting layer, and a heating layer. The heating layer has a strip-like heating body consisting at least of fibers and formed with electrodes on both ends thereof. The heating body extends helically or linearly in the axial direction of the heat roller. The fibers intersect the axial direction at an angle θ satisfying a condition:

$$\theta=\cos^{-1}(lRs/2\pi rR)^{1/2}$$

where l denotes the length of the heating layer in the axial direction, Rs denotes the surface resistance of the heating body, π denotes the ratio of the circumference of a circle to a diameter, r denotes the radius of the heating layer, and R denotes the resistance of the heating body.

Further, in accordance with the present invention, a method of producing a fixing roller has the steps of preparing a cylindrical mandrel, temporarily adhering annular electrodes in the form of conductive tapes to opposite ends of the mandrel with respect to the axial direction of the mandrel, winding a resistance body in the form of a sheet constituted by strip-like fibers, the resistance body turning out a heating layer, inserting the mandrel with the annular electrodes and resistance body into the bore of the base and heating the mandrel, and pulling out the mandrel.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENTS

Figure 1:
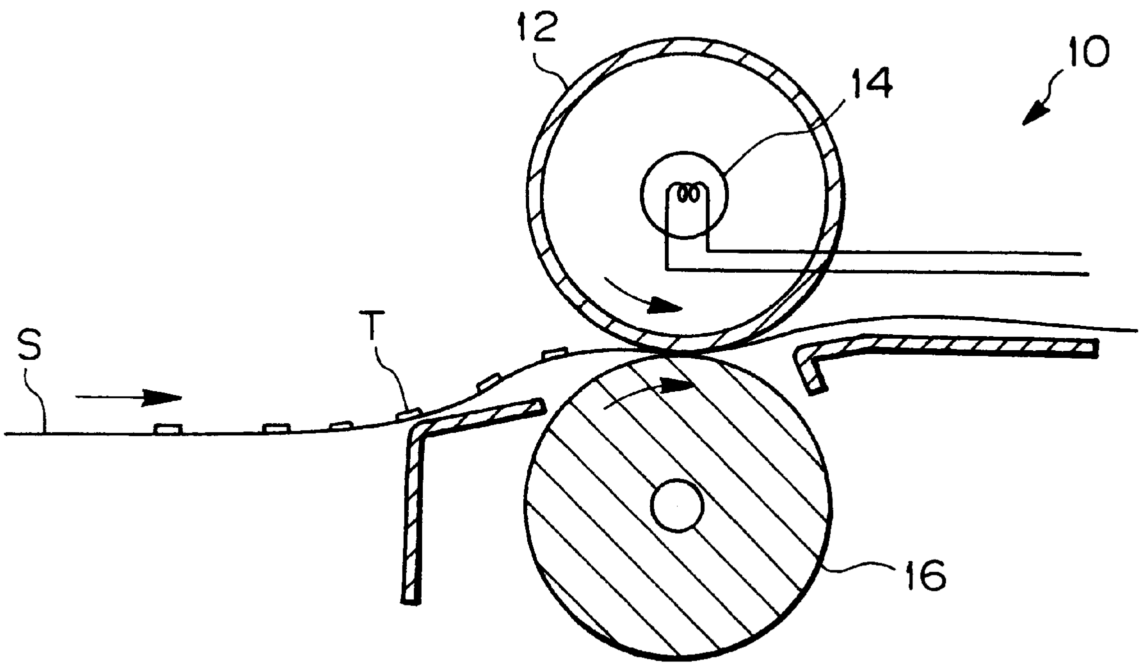
Fig. 1 PRIOR ART
FIG. 1 is a section showing a conventional fixing device.

To better understand the present invention, brief reference will be made to a conventional fixing device for an image forming apparatus, shown in FIG. 1. As shown, the fixing device, generally 10, has a heat roller 12 and a press roller 16 held in pressing contact with the roller 12. The heat roller 12 has a rod-like halogen lamp 14 thereinside. When the heat roller 12 and press roller 16 rotate while nipping a sheet S carrying toner T thereon, heat is applied from the lamp 14 to the sheet S. As a result, the toner T is fixed on the sheet S by the heat and pressure. However, because the heat from the lamp 14 is applied to the sheet S not directly, but by way of the heat roller 14, it is difficult to heat the surface of the heat roller 14 in a short period of time.

Figure 2:
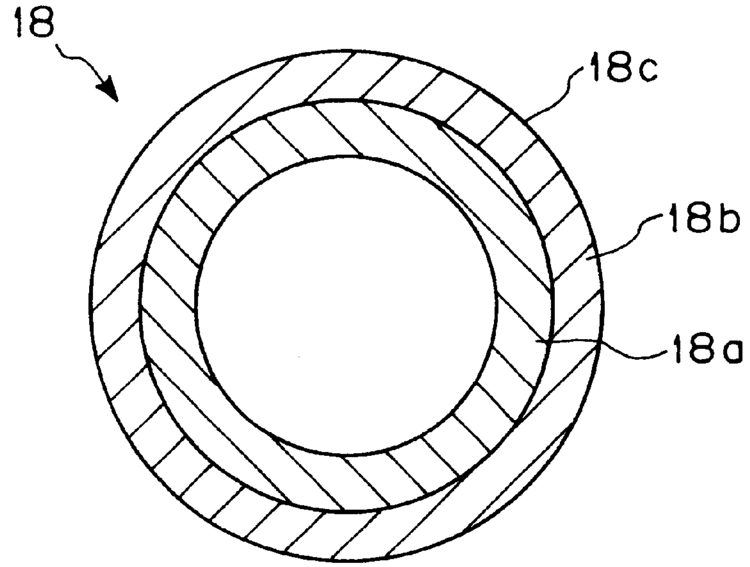
Fig. 2 PRIOR ART
FIG. 2 is a section showing a conventional heat roller.

FIG. 2 shows a specific heat roller 18 proposed to solve the above problem particular to the indirect heating scheme. As shown, the heat roller 18 is made up of a hollow cylindrical base 18*a*, a heating layer 18*b* surrounding the base 18*a*, and a parting layer 18*c* surrounding the heating layer 18*b*. The base 18*a* is implemented as a pipe formed of ceramics, glass or similar material. The parting layer 18*c* is formed of fluorine-contained resin having a high parting ability in order to prevent toner from adhering due to heat. The heating layer or body 18*b* is formed of a heating material having a PTC characteristic, e.g., a sintered body of glass and barium titanate or nickel-boron alloy. The prerequisite with the heat roller 18 is that the heating layer or resistance body 18*b* be sufficiently resistive to heat and be durable. This limits the range of materials applicable to the resistance body 18*b*, i.e., prevents a material having any desired resistivity from being used.

Figure 3:
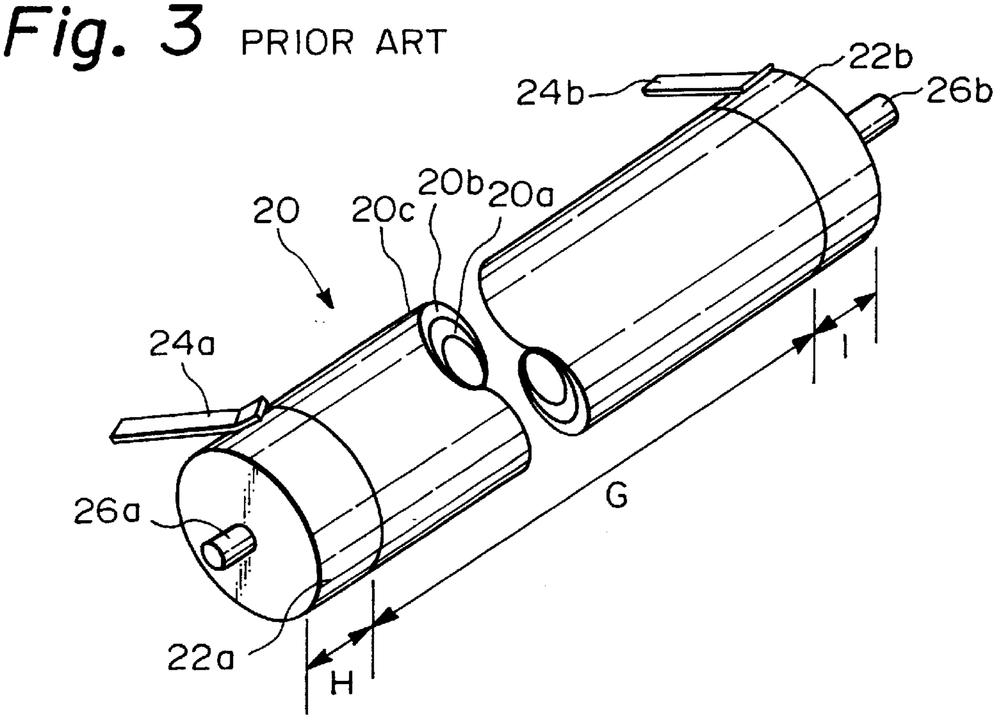
Fig. 3 PRIOR ART
FIG. 3 is a perspective view showing a conventional fixing device using a direct heating system.

FIG. 3 shows another conventional fixing device using a direct heating scheme and taught in Japanese Patent Laid-Open Publication No. 7-140824 mentioned earlier. As shown, a heat roller 20 is made up of a thermal insulating layer 20*a*, a heating layer 20*b*, and a parting layer 20*c*. Electrode layers 22*a* and 22*b* for receiving a voltage are formed on opposite ends of the heating layer 20*b*, respectively. Electrodes 24*a* and 24*b* for feeding a voltage are held in contact with the electrode layers 22*a* and 22*b*, respectively. The heat roller 20 is journalled to a frame, not shown, by opposite rotary shaft portions 26*a* and 26*b*. The electrode layers 22*a* and 22*b* respectively extend over ranges H and I in the axial direction of the heat roller 20. The heat roller 20 has a heating surface extending over a range G in the axial direction thereof.

The parting layer 20*c* surrounding the heating layer 20*b* is about 0.005 mm to 0.05 mm thick. The heating layer 20*b* is, in effect, formed on the outer periphery of a substantially cylindrical base. This kind of configuration is apt to bring about the following problems.

(1) Assume that the heat roller 20 catches fire due to unusual temperature elevation. Then, the heating element 20 is likely to burn a sheet contacting it. The heat roller 20 is therefore more liable to catch fire than a heat roller using a halogen lamp. Apart from unusual temperature elevation, when the parting layer 20*c* wears and comes off due to a long time of operation, the heating layer 20*b* appears on the periphery of the heat roller 20. As a result, it is likely that a spark is generated due to defective contact and flies to the sheet and surrounding parts. In this manner, the heat roller 20 is questionable in the safety operation aspect.

(2) Because the heating layer 20*b* exists on the outer periphery of the heat roller 20, it is difficult to provide the roller 20 with desirable surface roughness.

(3) While the fluorine-contained resin or similar parting layer 20*c* is formed on the heating layer 20*b*, the two layers 20*b* and 20*c* lack affinity and make it difficult to maintain the durability of the roller 20.

(4) The wall thickness of the heat roller 20 is selected to be small enough for the surface of the roller 20 to reach a preselected temperature in a short period of time. However, when a press roller, not shown, presses the heat roller 20, the roller bends (collapses) in the radial direction with respect to the axis of the roller 20. As a result, a sheet being passed through the nip between the two rollers creases.

(5) Further, the pressure of the press roller acting on the heat roller 20 causes the roller 20 to bend beyond an allowable range and causes the sheet to crease.

Figure 4:
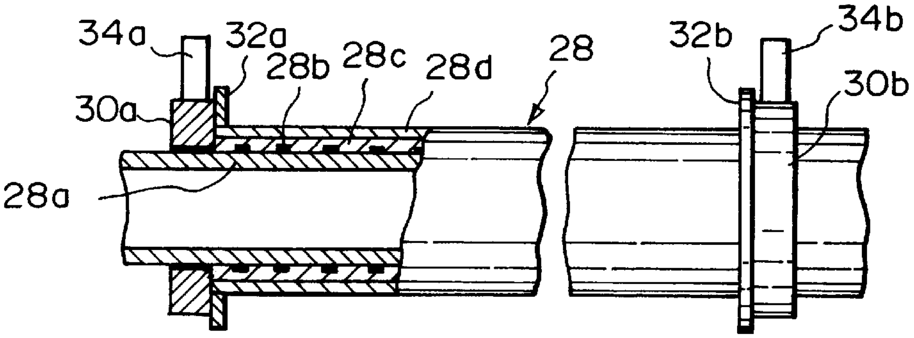
Fig. 4 PRIOR ART
FIG. 4 is a partly sectional front view of a heat roller included in another conventional fixing device using a direct heating system.
Figure 5:
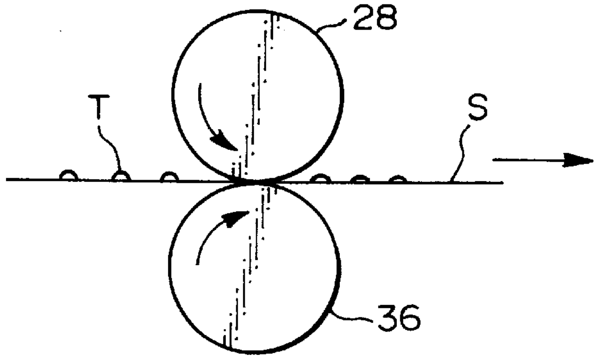
Fig. 5 PRIOR ART
FIG. 5 is a side elevation showing a fixing device including the heat roller of FIG. 4.

FIGS. 4 and 5 show another conventional heat roller 28 using the direct heating scheme and disclosed in Japanese Patent Laid-Open Publication No. 6-332333. As shown, the heat roller 28 includes a hollow cylindrical base 28*a* formed of alumina. A strip-like resistance pattern 28*b* is formed on the outer periphery of the base 28*a* and formed of a heating substance. A protection layer 28*c* covers the resistance pattern 28*b*. A parting layer 28*d* is formed on the protection layer 28*c*. Electrode rings 30*a* and 30*b* are respectively provided on opposite ends of the outer periphery of the heat roller 28 in order to feed a current to the resistance pattern 28*b*. Washer rings 32*a* and 32*b* respectively adjoin the electrode rings 30*a* and 30*b* and have a greater diameter than the rings 30*a* and 30*b*. When a current is fed via brushes 34*a* and 34*b*, the resistance pattern 28*b* generates Joule heat and heats the entire heat roller 28. Because the heat roller 28 has its surface directly heated, the temperature of the surface can reach a preselected temperature in a short period of time. This successfully reduces the waiting time up to fixation and saves power.

However, the above heat roller 28 has some problems yet to be solved, as follows.

(1) As shown in FIG. 5, assume that the sheet 5 is nipped between the heat roller 28 and a press roller 36. Then, because the parting layer 28*d* is extremely thin, the sheet S is put in substantially the same condition as one occurring when the sheet S directly contacts the resistance pattern or heating layer 28*b*. Therefore, if the temperature of the hat roller 28 rises to an unusual level by accident, the sheet S is likely to catch fire. Apart from unusual temperature elevation, when the parting layer 28*d* wears and comes off due to a long time of operation, the resistance pattern or heating layer 28*b* appears on the periphery of the heat roller 28. As a result, it is likely that a spark is produced due to defective contact and flies to the sheet and surrounding parts.

(2) The parting layer 28*d* formed of fluorine-contained resin or similar material and the protection layer 28*c* mainly formed of glass lack affinity. It is therefore difficult to maintain durability over a long period of time.

(3) The electrode rings 30*a* and 30*b* and the brushes 34*a* and 34*b* adjoin the sheet passing portion although separated by the washer rings 32*a* and 32*b*. As a result, toner, paper dust and other impurities are apt to deposit on the sliding surfaces of the brushes 34*a* and 34*b* and cause them to wear.

(4) The electrode rings 30*a* and 30*b* and brushes 34*a* and 34*b* slide on each other on a circumference having a preselected radius, so that their relative speed is high. Consequently, the surfaces sliding on each other wear with the elapse of time, obstructing the feed of a current.

(5) Assume that the wall thickness of the base 28*a* is reduced to reduce the period of time necessary for the heat roller 28 to reach the preselected temperature. Then, the press roller 36 causes the heat roller 28 to deform or collapse and thereby causes the sheet S to crease.

Preferred embodiments of the present invention free from the problems discussed above will be described hereinafter.

Figure 6:
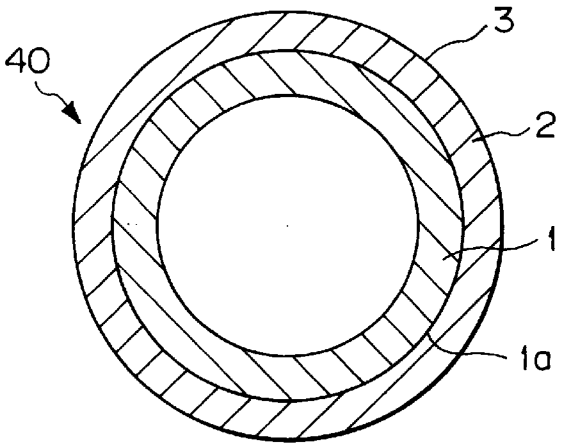
FIG. 6 is a section showing a first embodiment of the heat roller in accordance with the present invention.
Figure 7A:
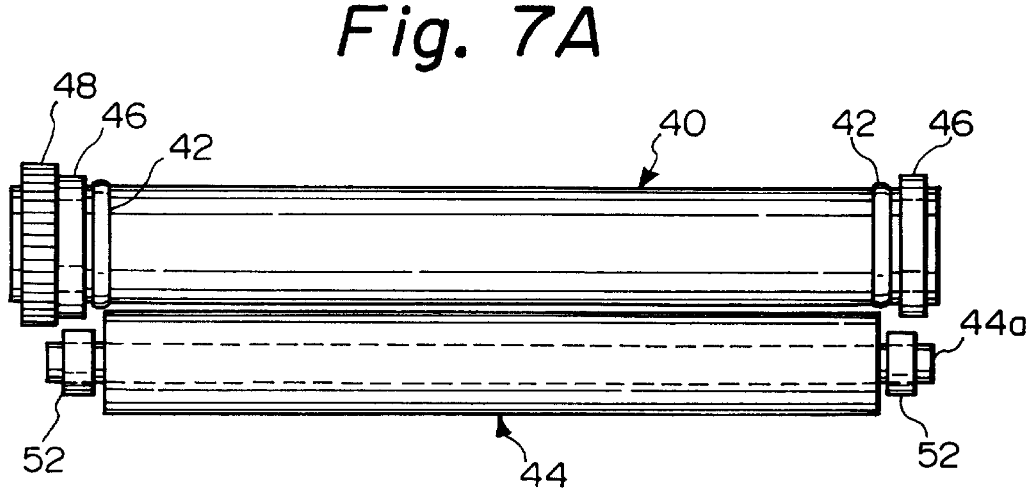
FIGS. 7A and 7B show a fixing device including the heat roller of FIG. 6.
Figure 7B:
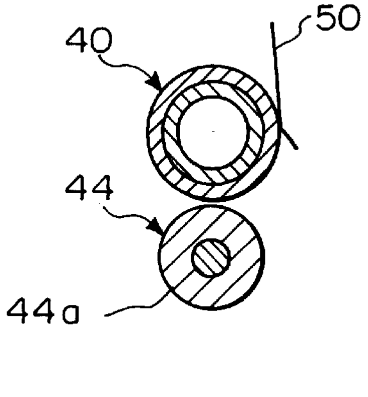

FIG. 6 shows a first embodiment of the heat roller in accordance with the present invention while FIGS. 7A and 7B show a fixing device using the heat roller. As shown in FIG. 6, a heat roller 40 has a hollow cylindrical base 1 formed of, e.g., aluminum, a heating layer 2 surrounding the base 1, and a parting layer 3 surrounding the heating layer 3. An electrical insulating layer 1*a* covers the outer periphery of the base 1 and is formed of imide resin, e.g., polimide resin or bismaleimide resin. The heating layer 2 covers the insulating layer 1*a* except for bearing portions. For the insulating layer 1*a*, use may be made of a thermally shrinkable tube formed of an electrical insulating and thermoplastic substance, e.g., PFA resin.

The base 1 has a wall thickness of, e.g., 0.3 mm and has a heat capacity which is about 86% of the heat capacity of a 0.5 mm thick glass tube. The heating layer 2 is implemented by a prepreg of carbon fibers (#301 available from Toray Industries, Inc.). This kind of prepreg is formed by impregnating a bundle of carbon fibers with bismaleimide resin. The prepreg is in the form of an about 100 μm thick sheet. After electrical insulating adhesive has been applied to the base 1, the carbon fiber prepreg is helically wound round the base 1. As shown in FIG. 7A, a conductive paste is applied to opposite ends of the heating layer or prepreg 2 where the carbon fibers are exposed to the outside, forming annular electrodes 42. Of course, the annular electrodes 42 may be in the form of tapes formed of conductive metal.

The parting layer 3 formed of an electrical insulating material covers the heating layer 2 except for the annular electrodes 42. For the parting layer 3, use is made of a PFA resin tube available from Gunze Ltd. and 50 μm thick. Adhesive is applied to the inner surface of the PFA resin tube.

As shown in FIGS. 7A and 7B, the fixing device has a press roller 44 in addition to the heat roller 40. Bearings 46 are provided on the opposite ends of the heat roller 40. A gear 48 is mounted on one end of the heat roller 40. As shown in FIG. 7, a brush 50 is held in contact with the respective annular electrode 42 in order to feed a preselected voltage via the electrode 42. The press roller 44 has a shaft 44*a* and a rubber roller mounted on the shaft 44*a*. Bearings 52 are provided on opposite ends of the shaft 44*a*.

Figure 8:
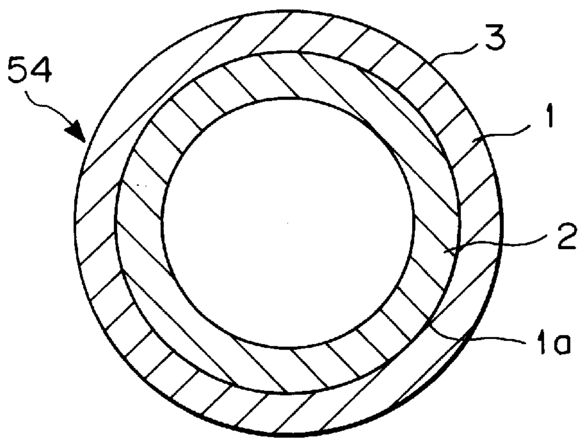
FIG. 8 is a section showing a second embodiment of the heat roller in accordance with the present invention.

FIG. 8 shows a second embodiment of the present invention. This embodiment will be described with reference also made to FIGS. 9A and 9B. As shown in FIG. 8, a heat roller 54 has the heating layer 2 formed on the inner periphery of the base 1, and has the parting layer 3 formed on the outer periphery of the base 1. Specifically, the electrical insulating layer 1*a* formed of imide resin covers the inner periphery of the base 1 while the heating layer 2 is formed on the inner periphery of the insulating layer 1*a*. The insulating layer 1*a* may be implemented as a thermally shrinkable tube formed of an insulating thermoplastic material, e.g., PFA resin or may be implemented by insulating adhesive, as in the previous embodiment.

Figure 9A:
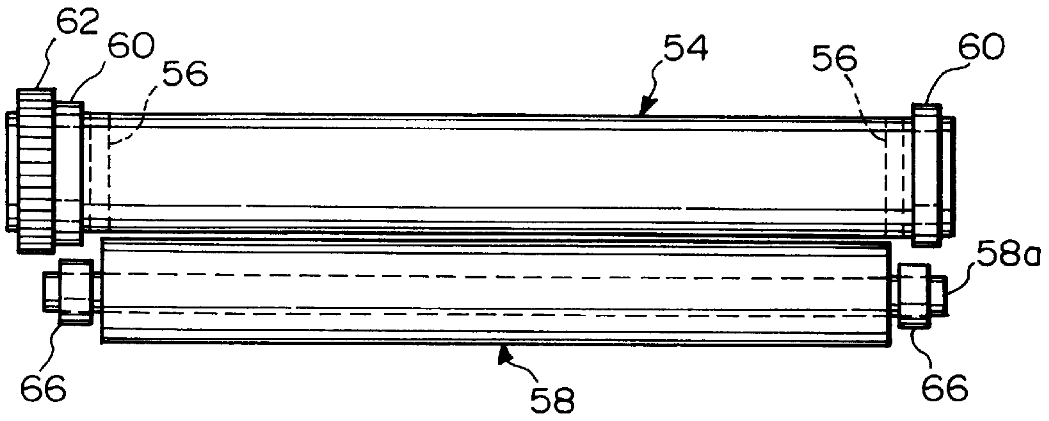
FIGS. 9A and 9B show a fixing device including the heat roller of FIG. 8.

The base 1 is formed of, e.g., aluminum and 0.5 mm thick. The heating layer 2 is identical with the heating layer 2 of the first embodiment. As shown in FIG. 9A, annular electrodes 56 are implemented by tapes formed of conductive metal. The annular electrodes 56 are respectively fitted on the inner periphery of the heating layer or prepreg 2 at the opposite ends of the layer 2 where the carbon fibers are exposed to the outside. The parting layer 3 covering the base 1 is identical in configuration and dimension with the parting layer 3 of the previous embodiment.

Figure 9B:
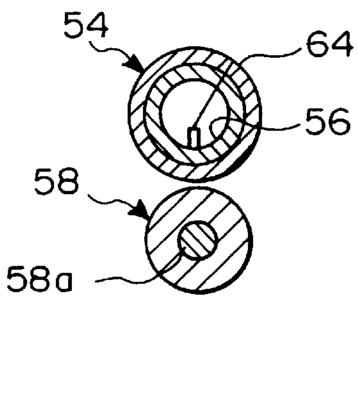

As shown in FIGS. 9A and 9B, a fixing device has a press roller 58 in addition to the heat roller 54. Bearings 60 are provided on opposite ends of the heat roller 54. A gear 62 is mounted on one end of the heat roller 54. As shown in FIG. 9B, an electrode brush 64 is held in contact with the respective electrode 56 in order to feed a preselected voltage to the heating layer 2 via the electrode 56. The press roller 58, like the press roller 40, is made up of a metallic shaft 58*a* having a diameter of, e.g., 10 mm and a length of, e.g., 340 mm, and 10 mm thick silicone rubber covering the intermediate portion of the shaft 58*a* over 320 mm. Bearings 66 are provided on both ends of the press roller 58.

Figure 10:
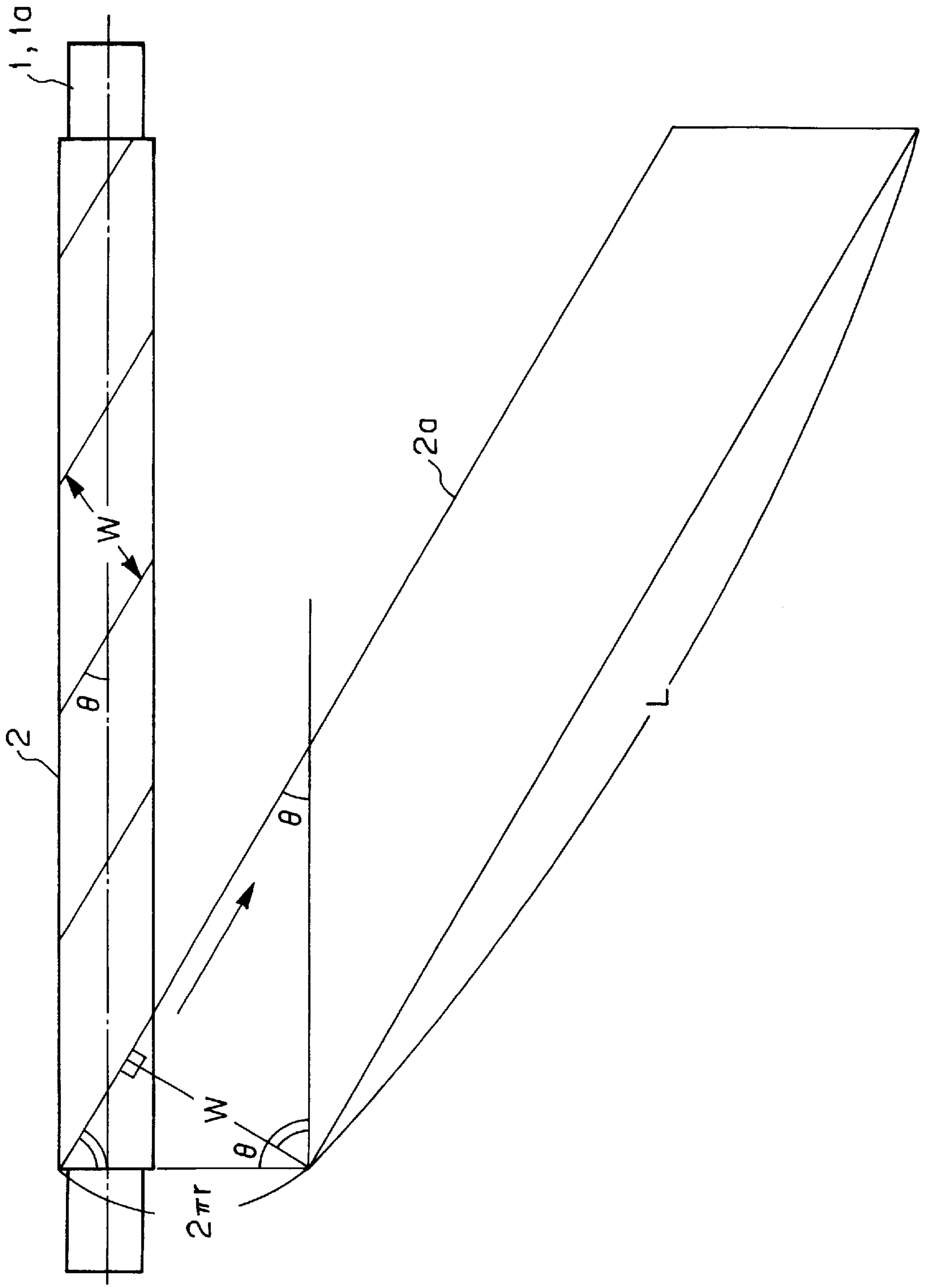
FIG. 10 is an elevation and a developed view of the heat roller in accordance with the present invention.
Figure 11:
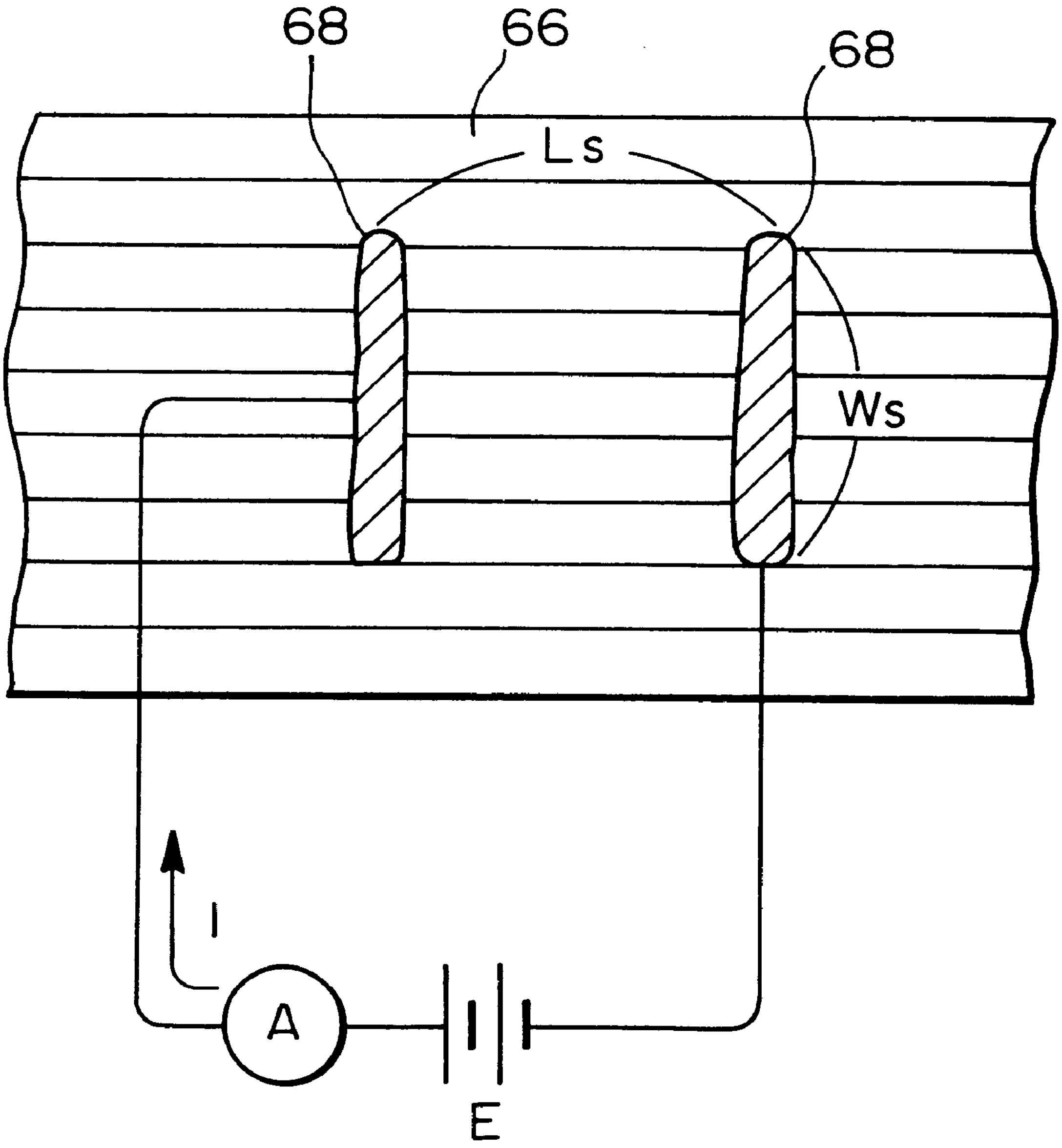
FIG. 11 shows an arrangement for measuring the resistance of fibers.

Reference will be made to FIGS. 10 and 11 for describing the heating layer 2 of the first embodiment in detail, FIG. 10 shows the heating layer 2 in an elevation and a developed view. As shown, in the heat roller 40, a carbon fiber prepreg 2*a* is cut obliquely in a parallelogram configuration and wound helically round the base 1. As shown in FIG. 11, the number of carbon fibers is determined by a current necessary for implementing preselected power. Assume that the bundle of carbon fibers for implementing the preselected power is extendible over a width Wm. Because actual carbon fibers are twisted, they have a width W smaller than the above width.

The width W of the prepreg 2*a* is determined by the diameter of the base 1. Assuming that the base 1 has a radius r, then the width W is 2 πr. Assume that the bundle of carbon fibers (prepreg 2*a*) having the width W has a length L and a surface resistance Rs ($\Omega/cm^2$) in the direction of the bundle (inversely proportional to the sectional area and resistivity of the bundle). Then, a resistance R is expressed as:

$$R=Rs\cdot L/W \qquad \text{Eq. (1)}$$

The heating layer 2 has a heating are W·L which is the product of the length L and width W of the heating body (strip-like fibers). The heating area W·L is equal to the circumferential length (2 πr) and length l of the heating layer 2, so that it is produced by:

$$W \cdot L = 2\pi r l \quad \text{Eq. (2)}$$

As schematically shown in FIG. 11, assume that electrodes 68 are positioned at both ends of fibers 66', that a voltage E is applied to the fibers 66' via the electrodes 68, that the electrodes 68 are spaced by a distance Ls, and that the electrodes 68 each has a width Ws. Then, a current I flows through the fibers 66'. The surface resistance Rs of a resistance body is expressed as:

$$Rs = (I/E) \cdot (Ws/Ls) \quad \text{Eq. (3)}$$

To provide the heating body 2 with desired power P, the voltage E, power P and resistance R are related as:

$$P = E^2/R \quad \text{Eq. (4)}$$

The resistance R of the heating body 2 is produced by:

$$R = E^2/P = Rs \cdot L/W \quad \text{Eq. (5)}$$

The resistance R of the heating body (fibers) is determined by the surface resistance Rs of the heating body. The heating area (2 πrl) of the heating layer 2 is determined by the length L and width of the heating body of the layer 2 (strip-like fibers). The heating layer 2 implementing the desired power P can be formed on the basis of the Eq. (5). Assuming that the heating layer 2 has a radius r and a length l, then the area W·L allowing the bundle of fibers to be wound and the actual area (2 πrl) of the layer 2 have the following relation:

$$Wm \cdot L \geqq W \cdot L = 2\pi r l \quad \text{Eq. (6)}$$

While fiber without twist have the width Wm which is the product of the diameter of a single fiber and the number of fibers, fibers with twist spread little. The actual bundle of fibers have the width W smaller than the above width Wm. It follows that only if the Eq. (6) is satisfied, the heating element can be formed without any gap.

Further, if both the Eqs. (1) and (2) are satisfied, the heating layer 2 can be provided with a desired area on the basis of the desired resistance R:

$$W = (2\pi r l Rs/R)^{1/2} \quad \text{Eq. (7)}$$

$$L = (2\pi l R/Rs)^{1/2} \quad \text{Eq. (8)}$$

As FIG. 10 indicates, the strip-like heating body is wound by an angle θ produced by:

$$\theta = \cos^{-1}(W/2\pi r) \quad \text{Eq. (9)}$$

By substituting the Eq. (7) for the Eq. (9), the winding angle θ is expressed as:

$$\theta = \cos^{-1}(1\ Rs/2\pi r R)^{1/2} \quad \text{(Eq. (10)}$$

It is to be noted that θ is the angle at which the fibers intersect the axial direction of the heat roller, l is the axial length of the heat roller with the heating layer 2 wound thereround, Rs is the surface resistance of the fibers or that of the assembly of fibers and binder, as measured in the direction of fibers, π is the ratio of the circumference of a circle to its diameter, r is the radius of the cylindrical heating layer 2, and R is the resistance of the layer 2.

The Eq. (10) produces the winding angle θ based on the preselected fiber width by using the simultaneous equations of the resistance R for implementing the heating layer 2 and the heating area of the layer 2, i.e., a current flows substantially only in the direction of fibers. This is why the angle θ satisfying the relation between the above two factors is derived from the Eq. (10). For the heating layer 2 to obtain the preselected power based on the preselected resistance, a desired amount heat is determined on the basis of the Eq. (10). Therefore, the heating layer 2 generating a desired amount of heat can be formed by use of a commercial power source. This allows the heat roller 40 to be formed without resorting to an expensive power source device.

The fibers in the form of a sheet make point-to-point contact with each other, so that a current flows mostly in the direction of fibers; a current flowing perpendicularly to the fibers can be neglected. Specifically, the heating layer 2 between the annular electrodes 42 serves as a heating body consisting at least of fibers. The fibers are arranged evenly without any gap helically at the angle θ satisfying the Eq. (10) or linearly in the axial direction of the roller. With this configuration, the heat roller 40 generates heat uniformly and has a uniform temperature distribution in its axial direction. Of course, to provide the heating layer 2 with the desired resistance, fibers of good conductor or filaments of metal may be mixed with the above fibers in a preselected ratio.

The characteristic of the fibers forming the heating body 2 depends on the material of the fibers, as follows. Assume a fixing device incorporating the heat roller 40 of the present invention and feeding sheets, whose maximum size if A3, lengthways. In the heat roller 40, the base 1 is formed of aluminum and has a diameter of 20 mm, a length of 360 mm, and a wall thickness of 0.4 mm. The insulating layer **1*a* covering the outer periphery of the base 1 is formed of imide resin. The heating layer 2 covering the insulating layer 1*a* is constituted by fibers. The heating layer 2 is 320 mm long and has a heating area of 201 $cm^2$. The annular electrodes 42 provided on both ends of the heat roller 40 are 5 mm wide each and formed of copper. The heating layer 2 has a resistance of 12.5 Ω which implements power consumption of 800 W when 100 V is applied. A voltage is fed via the brushes 50. The parting layer 3 covering the outer periphery of the heat roller 40** except for the bearing portions is implemented by a PFA resin tube.

The fixing device having the above construction was operated with various kinds of heating bodies each consisting of a particular kind of fibers. Heating tests were conducted by using sheets of postcard size. Temperature distributions were measured by thermography. The results of such tests conducted with Examples 1–4 are listed in Table 1 below. In Table 2, the temperature elevation time refers to a period of time necessary for the temperature to rise from the room temperature of 25° C. to 170° C.

TABLE 1

| | | Surface Resis-tance $\Omega/cm^2$ | Fiber Width (mm) | Wind-ing Angle | Temp Elevation Time, Temp Scattering | Temp Scattering During Sheet Feed |
|---|---|---|---|---|---|---|
| Ex. 1 | PAN-based carbon resin | 0.62 | 31 | 60° | 8.2(s) below 4° C. | 18° C. |
| Ex. 2 | pitch-based carbon resin | 0.36 | 24 | 68° | 8.6(s) below 1° C. | 8° C. |
| Ex. 3 | aramid fiber & SUS fiber mixture (1:1) | 0.04 | 8 | 82° | 13.5(s) below 7° C. | 33° C. |
| Ex. 4 | glass fiber copper-sulfurized & then nickelized | 0.14 | 15 | 76° | 11.4(s) below 10° C. | 40° C. |

As Table 1 indicates, in Examples 1–4 each has a heating body uniformly arranged without any gap and shows hardly any critical irregularity at the time of temperature elevation. However, Examples 3 and 4 each needs a bundle of a great number of fibers because a current flows through only a part of the fibers. This is why the heating layers 2 of Examples 3 and 4 are as thick as 2.2 mm and about 2 mm, respectively. By contrast, the heating layers 2 of Examples 1 and 2 are as thin as 0.1 mm and 0.12 mm, respectively. The thick heating layers 2 each has a great heat capacity itself and therefore increases the temperature elevation time.

The difference between Examples 1–4 as to irregularity in temperature at the time of sheet feed is ascribable to the difference in the thermal conductivity of the heating body. In Example 2, use is made of pitch-based carbon fibers whose thermal conductivity is 410 W/m·K (generally 100 W/m·K to 1,000 W/m·K) comparable with 400 W/m·K available with copper. While PAN-based carbon fibers are less expensive than pitch-based carbon fibers, their thermal conductivity is as low as 19 W/m·K (generally 8 W/m·K to 100 W/m·K). This is because pitch-based carbon fibers are more graphitized than PAN-based carbon fibers. In this connection, graphite has a thermal conductivity of 1,950 W/m·K. Fibers in Examples 3 and 4 respectively have thermal conductivities of about 6 W/m·K and 1 W/m·K which are far smaller than the thermal conductivity of carbon biers. It will therefore be seen that the heating layer 2 exhibits the best characteristic when constituted by pitch-based carbon fibers.

Further, Example 2 was tested with a thermistor located at the end of the heating layer 2 (outside of a sheet passing region) and by passing sheets of different widths. The test showed that the temperature at the center is +8° C. without regard to sheet width, because the difference in temperature between the center and the end is small. It follows that Examples 1 and 2 are most desirable for the heating body of the heating layer 2.

Figure 12:
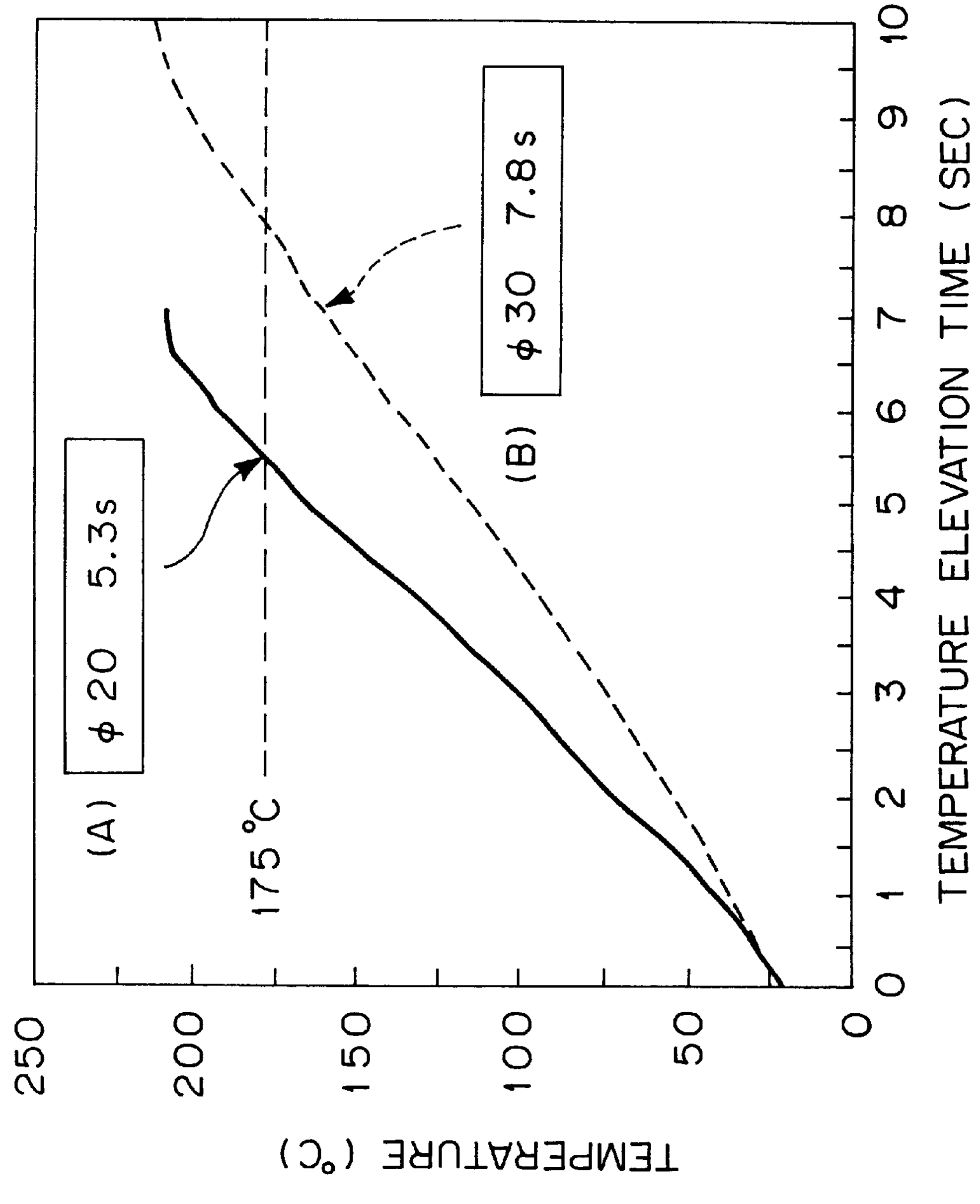
FIG. 12 shows temperature elevation particular to the heat roller shown in FIG. 6.

FIG. 12 shows the temperature elevation characteristic of the heat roller. In FIG. 12, the ordinate and abscissa are representative of temperature (°C.) and elevation time (sec), respectively. A curve A' is representative of a characteristic determined with a hollow cylindrical base formed of aluminum and having a diameter of 20 mm. A curve B' is representative of a characteristic determined with a base having the same configuration, but having a diameter of 30 mm. The two bases each had a wall thickness of 0.3 mm. As shown, the temperature rises from the room temperature of 25° C. to a preselected temperature (175° C.) within 10 seconds. This kind of bases therefore realize a fixing device showing sharp response, i.e., operable immediately even when the heater of the heat roller has been turned off and then turned on later. Turning off the heater when it is not necessary and turning it on only when it is necessary is desirable from the power saving standpoint.

Figure 13:
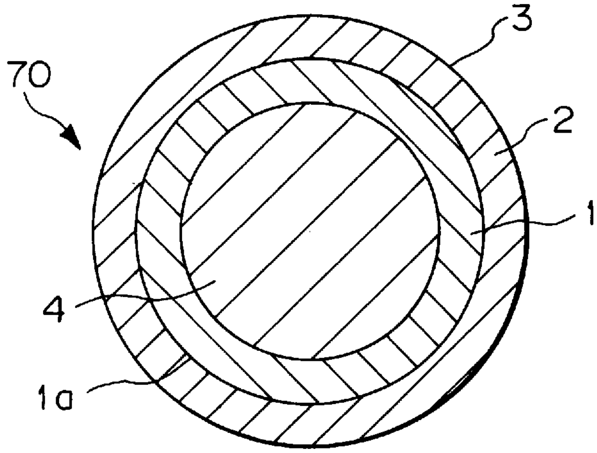
FIG. 13 is a section showing a third embodiment of the heat roller in accordance with the present invention.
Figure 14A:
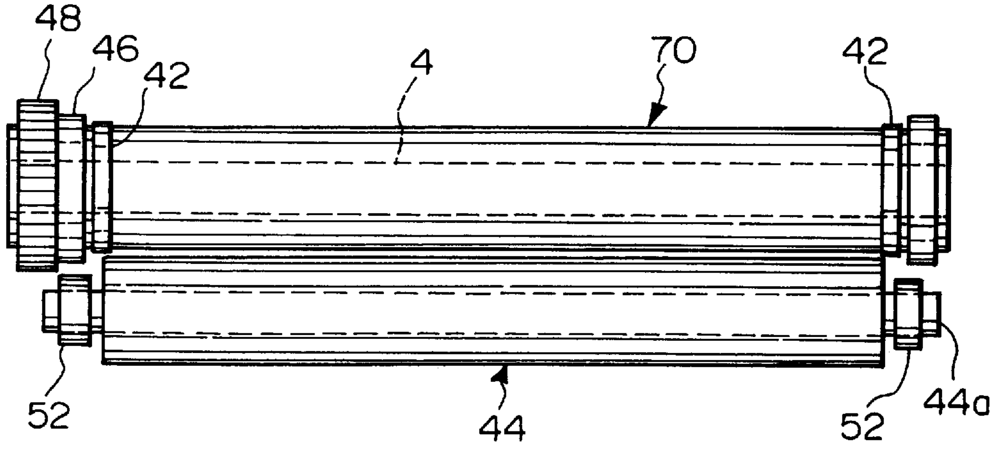
FIGS. 14A and 14B show a fixing device including the heat roller of FIG. 13.
Figure 14B:
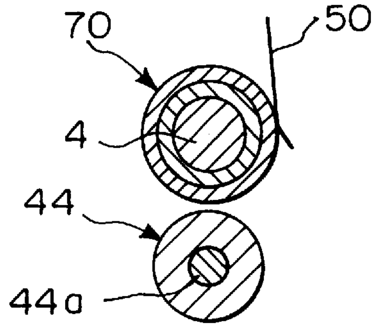

Referring to FIG. 13, a third embodiment of the present invention will be described. A fixing device incorporating the third embodiment is shown in FIGS. 14A and 14B. As shown in FIG. 13, a heat roller 70 is identical with the heat roller 40 of the first embodiment except that a thermal insulating material 4 fills the bore of the hollow cylindrical base 1. The thermal insulating material 4 has a foam structure or a porous structure. The rest of the configuration of the heat roller 70 will not be described in order to avoid redundancy.

The thermal insulating material 4 intercepts heat output from the heating layer 2 otherwise radiated via the base 1, thereby reducing the heat loss of the layer 2. Much of the heat output from the heating layer 2 is transferred to the parting layer 3. This allows the temperature to rise sharply after the passage of a sheet and reduces irregularity in the temperature variation in the axial direction of the heat roller 70. The heat roller 70 can therefore fix toner on a sheet with a desirable characteristic. Of course, the insulating material 4 may also fill the bore of the heating layer 2 shown in FIG. 8.

The heat roller 54 of the second embodiment, FIG. 8, is applicable to a fixing device, as follows. In the heat roller 54, the base 1 is formed of aluminum and has a diameter of 30 mm, a length of 360 mm, and a wall thickness of 0.5 mm. The electrical insulating layer 1*a* formed of imide resin covers the inner periphery of the base 1. The heating layer 2 of carbon fibers covers the inner periphery of the insulating layer 1*a*. The annular electrodes 56 are implemented as copper tapes which are 5 mm wide each. The heating layer 2 is provided with a resistance of 12.5 Ω implementing the power consumption of 800 W at 180° C. when 100 V is applied. This resistance is selected by taking account of a margin of 10° C. with respect to a set temperature of 170° C. The parting layer 3 covers the outer periphery of the heat roller 54. The bearings are formed of conventional fluorine-contained resin whose heat resisting temperature is 230° C. The press roller 58, FIGS. 9A and 9B, is pressed against the heat roller 54 by a spring exerting a preselected pressure. A current is fed to the heating layer 2 via the brush electrodes 64, FIGS. 9A and 9B.

The above fixing device was tested by passing postcards continuously therethrough. Temperature variations were measured by thermography. The results of experiments conducted with Comparative Examples 1 and 2 are listed in Table 2 below. In Table 2, the temperature variation time refers to a period of time necessary for the temperature to rise from the room temperature of 25° C. to 170° C.

TABLE 2

| Fiber | Temp Eleva-tion Time(s) | Postcard (A3) | 20 mm/s | 80 mm/s | 140 mm/s |
|---|---|---|---|---|---|
| Comp. Ex. 1 | 9.6 | end temp elevation | 18° C. | 50° C. | 80° C. |
| | | max power consumption | 798W | 825W | 865W |
| | | continuous feed error | ○ | X | X |
| Comp. Ex. 2 | 9.9 | end temp elevation | 8° C. | 30° C. | 55° C. |
| | | max power consumption | 795W | 828W | 855W |
| | | continuous feed error | ○ | ○ | X |

Comparative Examples 1 and 2 used PAN-based carbon fibers and pitch-based carbon fibers, respectively. In Table 2, circles and crosses respectively indicate that an error did no occur during continuous sheet feed and that an error occurred.

A problem with a heat roller using the direct heating scheme is that when sheets of relatively small size are continuously fed, the temperature of the roller rises more than necessary at both sides of the sheet passing region of the roller. In Table 2, the continuous feed error refers to the fact that the heat roller is brought out of its toner fixing temperature range due to the above unnecessary temperature elevation, resulting in defective fixation (hot offset) including irregularity in toner image. Just after the continuous feed of postcards, sheets of size A3 were fed at a speed of, in Comparative Example 1, 140 mm/sec. Then, the bearings were partly melted and sticked to a part of the heat roller while the heating body within the roller was partly peeled off the base at its ends.

The temperature elevation at the ends of the heat roller causes the maximum power consumption of the roller to increase because the heating layer or body of carbon fibers shows a negative temperature characteristic at temperatures between 10° C. and 20° C. In addition, the carbon fibers undergone a higher degree of graphitization tend to have a lower resistance and a greater temperature coefficient in absolute value. As a result, the resistance decreases at the ends of the heating layer due to the temperature elevation at the ends of the heat roller, and in turn increases the current to flow through the entire heating layer and thereby aggravates power consumption.

Table 2 therefore indicates that the temperature elevation at the ends of the heating layer not only causes various kinds of defects to occur at the ends of the heat roller, but also aggravates power consumption. The fixing device is intended to implement the maximum power consumption of 800 W. Table 3 shown below lists Comparative Examples 1-2 and 2-2 prepared to obviate the defects ascribable to the temperature elevation at the ends of the heating layer. Comparative Example 1-2 and 2-2 are heat rollers configured to reduce the power consumption to 800 W when a sheet is fed at a speed of 140 mm/sec. In this connection, in an electrophotographic image forming apparatus, the power consumption of a fixing device amounts to 50% to 80% of the total power consumption of the entire apparatus. To save power, therefore, reducing the power consumption of the heat roller is essential.

TABLE 3

| Fiber | Temp Elevation Time(s) | Postcard (A3) | 20 mm/s | 80 mm/s | 140 mm/s |
|---|---|---|---|---|---|
| Comp. Ex. 1-2 | 10.5 | end temp elevation | 19° C. | 51° C. | 79° C. |
| | | max power consumption | 738W | 763W | 799W |
| | | continuous feed error | ○ | X | X |
| Comp. Ex. 2-2 | 10.7 | end temp elevation | 10° C. | 32° C. | 56° C. |
| | | max power consumption | 739W | 770W | 796W |
| | | continuous feed error | ○ | ○ | X |

The heat roller of Comparative Example 1-2 was implemented by PAN-based carbon fibers while the heat roller of Comparative Example 2-2 was implemented by pitch-based carbon fibers. Comparative Example 1 is useful for comparing Comparative Examples 1 and 2 of Table 2 with Comparative Example 2-2.

As Table 3 indicates, in both of Examples 1-2 and 2-2, the temperature elevation time is delayed by 0.8 second to 0.9 second although the power consumption is successfully reduced. In an electrophotographic apparatus of the type not feeding a current to a heating layer when not used, even when the elevation time, i.e., start-up time is delayed by 1 second, the operator of the apparatus feels uneasy. Generally, the interval between the time when the operator approaches the apparatus and the time when the operator set documents touches a start button is about 2.5 seconds. Therefore, assuming that the interval between the feed start of a sheet and the arrival of the sheet at the fixing device is about 4.0 seconds, then the operator must simply wait until the time in excess of 6.5 seconds expires.

Specifically, in Comparative Example 1 needs a temperature elevation time of 9.6 seconds, so that the waiting time is 3.1 seconds. In Comparative Example 1-2, because the temperature elevation time is 10.5 seconds, the waiting time is 4.0 seconds which is 29% longer than the waiting time of Comparative Example 1. While the waiting time of Comparative Example 2 is 3.4 seconds, the waiting time of Comparative Example 2-2 is 4.2 seconds which is 24% longer than 3.4 seconds.

As to the temperature elevation at the ends of the heating layer, Tables 2 and 3 are exactly the same; in Comparative Example 1-2, the bearings are partly melted and peeled off in the case of 4.0 seconds for 140 mm/sec.

A fourth embodiment of the present invention will be described hereinafter. While the foregoing embodiments have paid attention to the thermal conductivity of the heating body, the fourth embodiment pays attention to the thermal conductivity of the metallic base. In addition, the fourth embodiment takes account of the modulus of elasticity because the base must be rigid against the pressure of fixation. In the embodiment to be described, the base formed of aluminum is provided with a wall thickness t corresponding to 0.5 mm and calculated on the basis of the modulus of elasticity.

The heat capacity of the base determining the temperature elevation time of the heat roller is produced by specific heat x density x thickness (t). Table 5 which will appear is respresentative of this embodiment. In Table 5, specific gravity available with the aluminum base is assumed to be "1" while heat capacities of bases formed of different materials are indicated in relative value. Because heat resistance is considered to effect the temperature distribution, it is determined by thermal conductivity x thickness (t) and represented by a value relative to "1" particular to the aluminum base.

First, characteristics particular to typical industrially applicable metals are listed in Table 4 below.

TABLE 4

| Material | Thermal Conductivity K(W/mK) | Modulus of Elasticity E(Gpa) | Thickness Corresponding to Rigidity of 0.5 mm Al (mm) | Heat Capacity (Relative Value) | Heat Resistance (Relative Value) |
|---|---|---|---|---|---|
| Al | 178 | 70 | 0.50 | 1.00 | 1.00 |
| Fe | 44 | 216 | 0.16 | 0.48 | 0.08 |
| Co | 381 | 112 | 0.31 | 0.82 | 1.32 |

Table 4 shows the characteristics of aluminum (Al), iron and copper. While a base formed of iron is expected to realize rapid temperature elevation, it will aggravate the temperature distribution. A base formed of copper is expected to implement both the rapid temperature elevation and the improved temperature distribution.

In light of the above, a heat roller with a copper base having a wall thickness of 0.31 mm was prepared in addition to the heat roller prepared with attention paid to the thermal conductivity of its heating body. In Table 5, Examples 1-2 and 2-2 are respectively representative of the heat roller having the particular heating body and the heat roller having the copper base. Comparative Examples 1-3 and 2-3 respectively include a heating layer in the form of a prepreg of PAN-based carbon fibers and a heating layer in the form of a prepreg of pitch-based carbon fibers. Comparative Examples 1-3 and 2-3 are identical with Comparative Examples 1-2 and 2-2 except for the material of the base.

TABLE 5

| Fiber | Temp Elevation Time(s) | Postcard (A3) | 20 mm/s | 80 mm/s | 140 mm/s |
|---|---|---|---|---|---|
| Comp. Ex. 1-3 | 7.9 | end temp elevation | 14° C. | 33° C. | 49° C. |
| | | max power consumption | 774W | 783W | 798W |
| | | continuous feed error | ○ | ○ | ○ |
| Comp. Ex. 2-3 | 8.1 | end temp elevation | 7° C. | 21° C. | 39° C. |
| | | max power consumption | 766W | 779W | 797W |
| | | continuous feed error | ○ | ○ | ○ |

As Table 5 indicates, the heat rollers of Comparative Examples 1-3 and 2-3 are free from fixation errors (hot offset) during continuous sheet feed. In addition, the bearings and heater are free from errors. Moreover, for the maximum power consumption of 800 W, the temperature elevation time is as short as 7.9 seconds in Comparative Example 1-3, which is contrastive to 10.5 seconds particular to Comparative Example 2-1. That is, the waiting time is reduced by 62%. This is also true with Comparative Example 2-3.

In the illustrative embodiment, the heating layer may be provided on the inner periphery or the outer periphery of the copper base, as desired. The heating layer may be constituted by any suitable material other than carbon fibers so long as it has a negative resistance coefficient.

Specific methods of producing the heat roller of the present invention will be described.

Figure 15A:
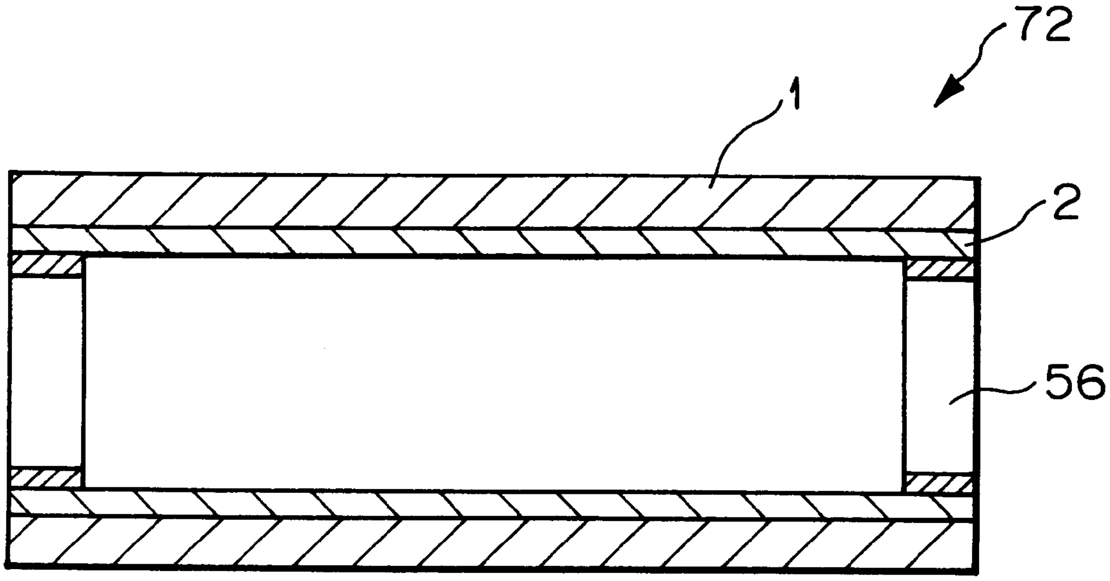
FIGS. 15A and 15B show an annular electrode included in the heat roller of FIG. 8 and held in contact with an electrode brush.
Figure 15B:
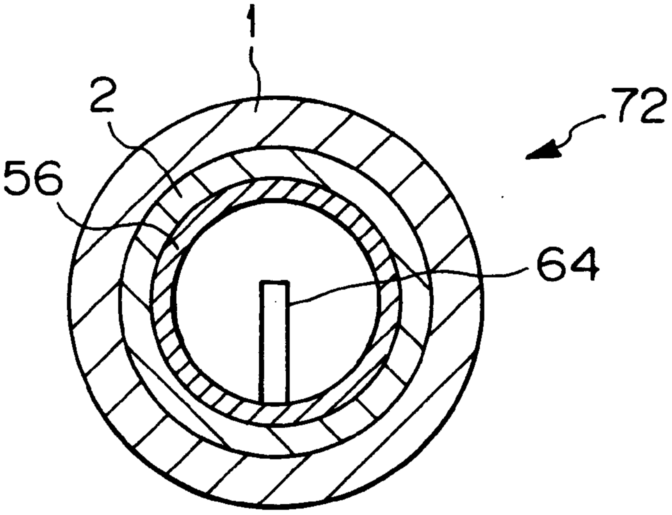

First, reference will be made to FIGS. 16A–16E for describing a method of producing a heat roller 72 shown in FIGS. 15A and 15B. As shown, the heat roller 72 has the base 1 formed of aluminum or copper. When the base 1 is formed of aluminum, its inner periphery is subjected to Alumite processing. The heating layer 2 is formed on the inner periphery of the base 1. Annular electrodes 56 are formed on both ends of the heating layer 2 and implemented by conductive metallic tapes. A brush 64 is held in contact with the respective electrode 56 in order to feed a voltage to the heating layer 2.

Figure 16A:
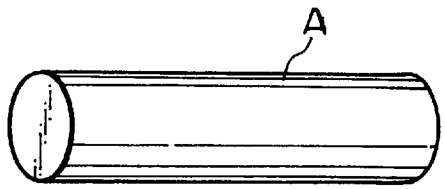
FIGS. 16A–16E are perspective views demonstrating a procedure for producing the heat roller shown in FIG. 8 or FIGS. 15A and 15B.
Figure 16B:
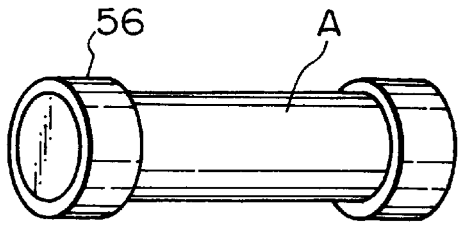

To produce the heat roller 72, as shown in FIG. 16A, a cylindrical jig for sheet transfer, i.e., a mandrel A11 is prepared for forming the heating layer 2. The mandrel A11 is formed of a material having a greater coefficient of thermal expansion than the base 1. As shown in FIG. 16B, the annular electrodes or conductive tapes 56 are temporarily adhered to both ends of the mandrel A11. The electrodes 56 may be implemented by copper tapes each having a thickness of several microns to several ten microns. Because the base 1 has a wall thickness of several hundred microns to 1 mm or above and because the heat capacity of the copper tapes is extremely small, heat loss ascribable to the electrodes 56 is negligible.

Figure 16C:
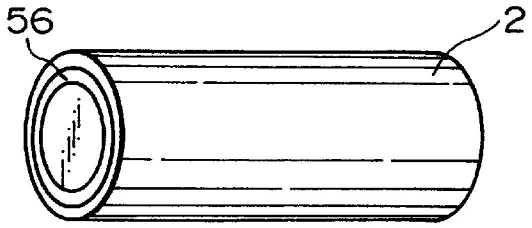
Figure 16D:
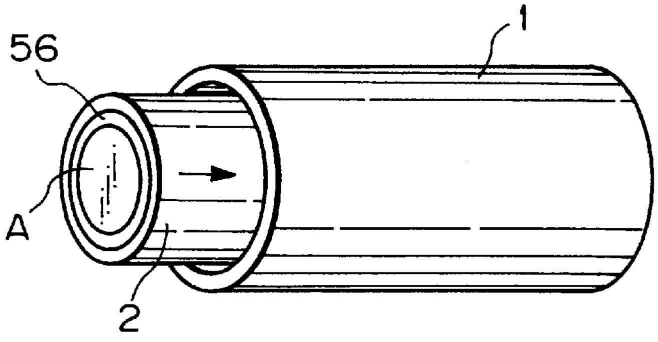
Figure 16E:
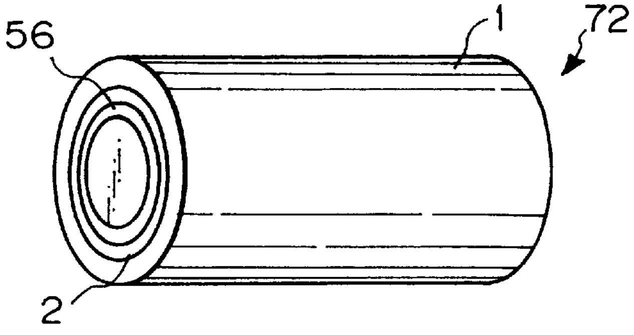

As shown in FIG. 16C, a resistance body in the form of a sheet is wound round the mandrel A11. This resistance body is the previously stated carbon fiber prepreg. How the prepreg is wound and how the power consumption is set will not be described in order to avoid redundancy. Subsequently, as shown in FIG. 16D, the mandrel A11 with the resistance body or sheet is inserted into the hollow cylinder or base 1 and then heated. As a result, the heating layer 2 is formed in the base 1. Adhesive for the heating layer 2 is implemented by the same resin as the carbon fiber prepreg. The heating temperature is selected in accordance with the hardening temperature of the adhesive. When the base 1 is formed of aluminum, an insulating layer is formed on the inner periphery of the base 1 after the Alumite processing. If desired, the mandrel A11 may be inserted into the base 1 after a parting layer of fluorine-contained resin has been formed on the outer periphery of the base 1. Further, the heating layer 2 may be formed in the base 1 prior to the formation of the parting layer. The mandrel A11 expands due to heat with the result that the heating layer 2 is firmly adhered to the inner periphery of the base 1, as shown in FIG. 16E.

Figure 17A:
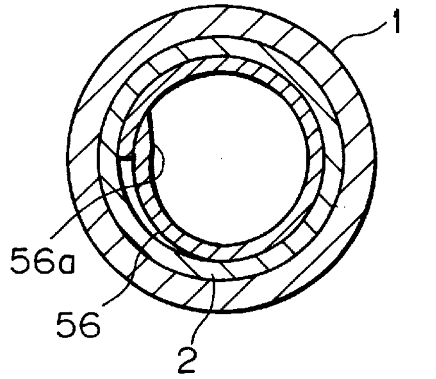
FIGS. 17A and 17B are sections showing a specific configuration of the annular electrode.
Figure 17B:
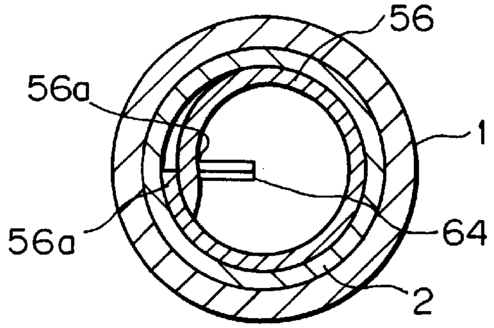

As shown in FIG. 17A, the opposite ends of each conductive metallic tape 56 overlap each other to form an overlapping portion 56*a*, and can therefore be formed without any gap. Because the tape or electrode 56 contacts the fibers constituting the heating layer 2, a current can flow throughout the fibers and allows the heating layer 2 to generate heat evenly. As shown in FIG. 17B, one end of the electrode 56 in the direction of rotation of the heat roller underlies the other end. Because the electrode brush 64 slides on the electrode 56, it does not turn over the electrode or tape 56.

Figure 18A:
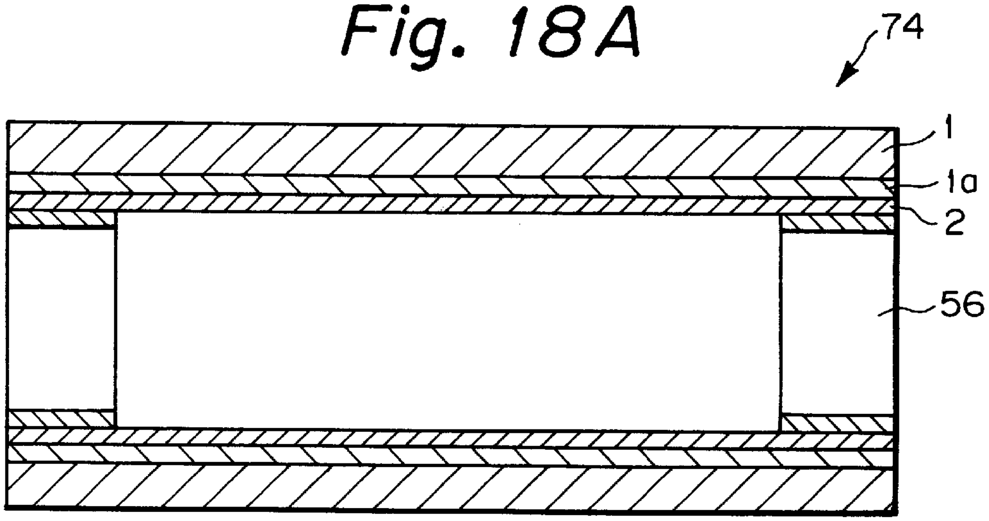
FIGS. 18A and 18B are vertical sections showing the electrode brush included in the heat roller of FIG. 8 and contacting the annular electrode.
Figure 18B:
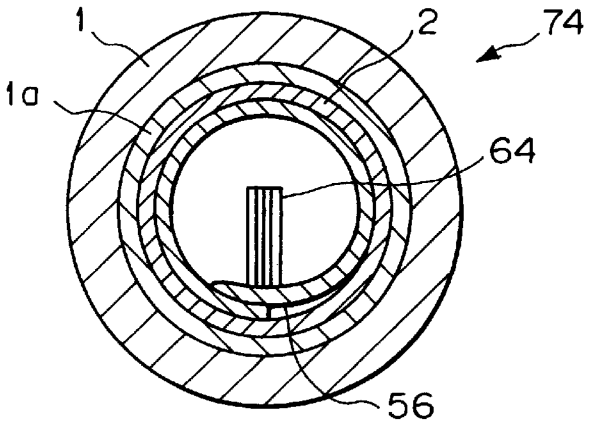

FIGS. 18A and 18B show a heat roller 74 whose base 1 is formed of aluminum, copper or copper alloy. The electrical insulating layer 1*a* is formed on the inner periphery of the base 1 while the heating layer 2 is formed on the inner periphery of the insulating layer 1*a*. The annular electrodes or tapes 56 are provided on both ends of the heating layer 2. Again, when the base 1 is formed of aluminum, the insulating layer 1*a* will be formed by Alumite processing. However, when the base 1 is not subjected to Alumite processing or is formed of copper or copper alloy, the insulating layer 1*a* will be implemented by resin, as stated earlier.

Figure 19A:
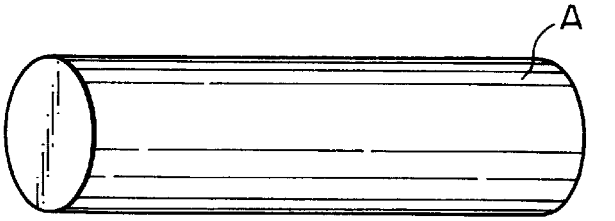
FIGS. 19A–19D are perspective views showing a method of producing the heat roller.
Figure 19B:
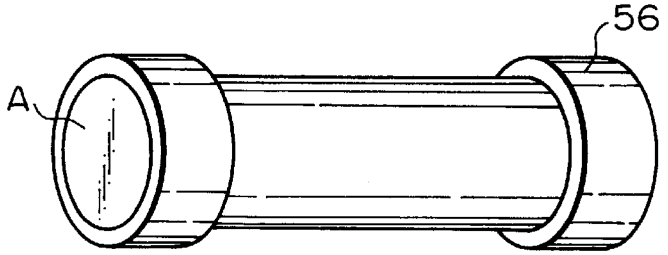
Figure 19C:
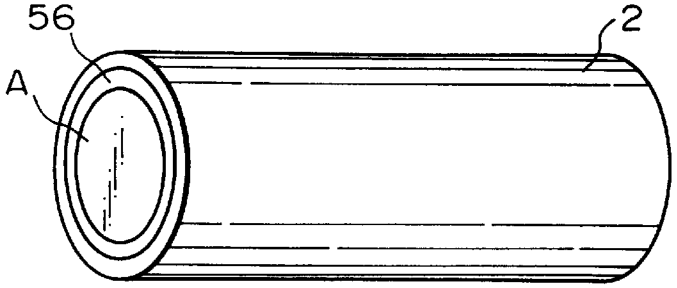
Figure 19D:
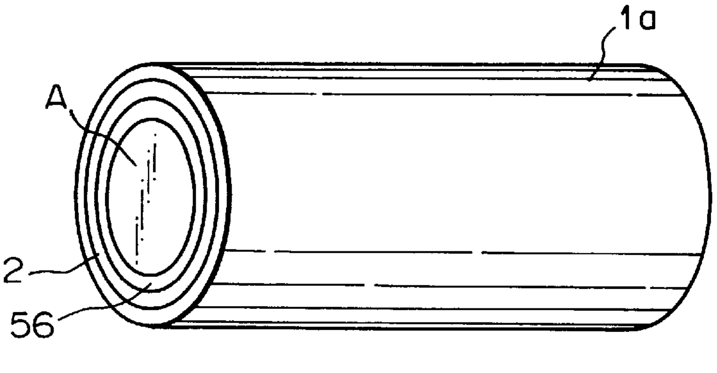
Figure 20B:
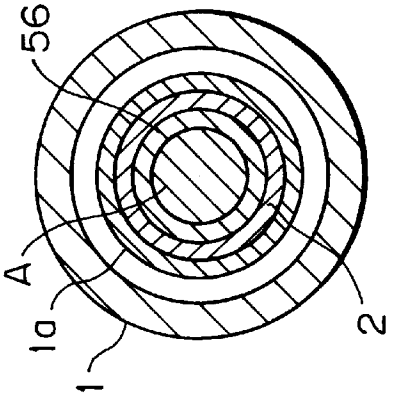
FIGS. 20A and 20B are perspective views showing a procedure following the procedure shown in FIGS. 19A–19D.
Figure 21B:
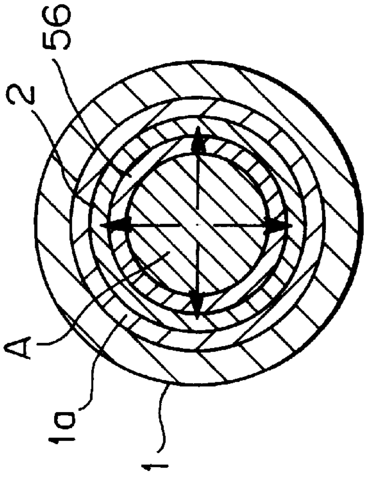
FIGS. 21A and 21B are perspective views showing a procedure following the procedure shown in FIGS. 20A and 20B.
Figure 20A:
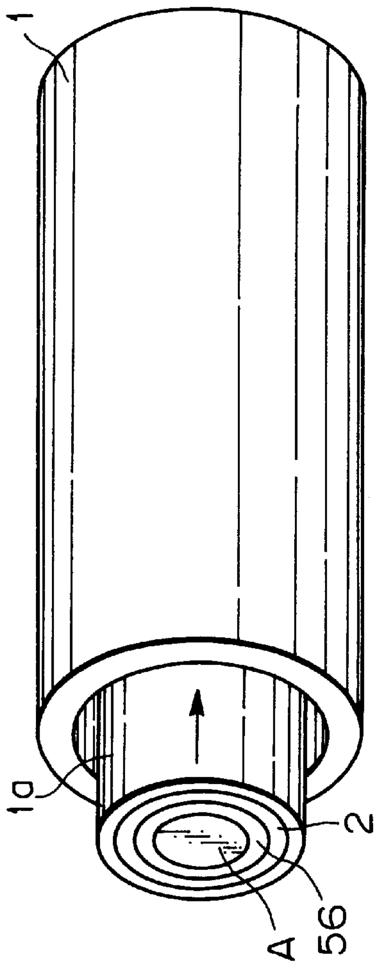
Figure 21A:
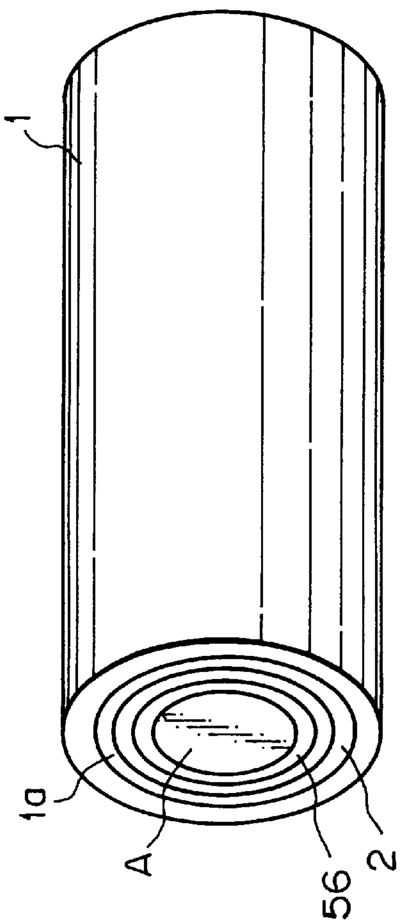
Figure 22B:
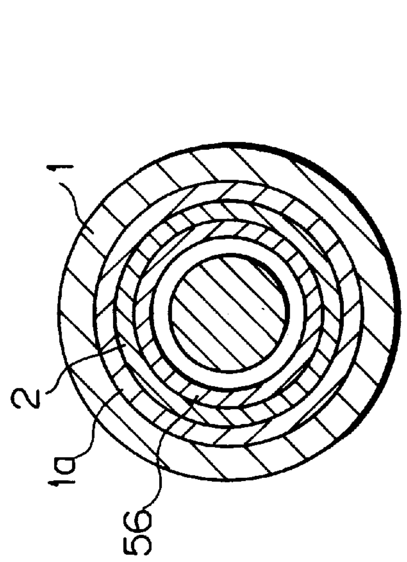
FIGS. 22A and 22B are perspective views showing a procedure following the procedure of FIGS. 21A and 21B.
Figure 23B:
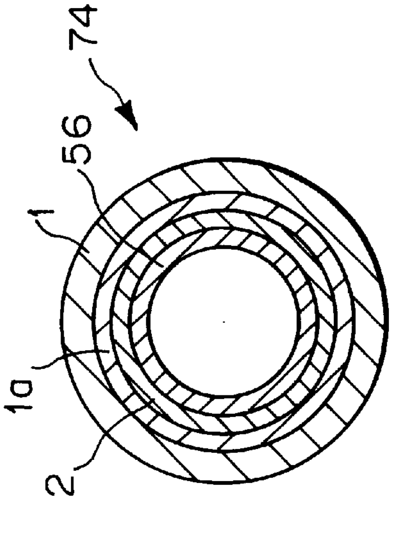
FIGS. 23A and 23B are perspective views showing a procedure following the procedure of FIGS. 22A and 22B.
Figure 22A:
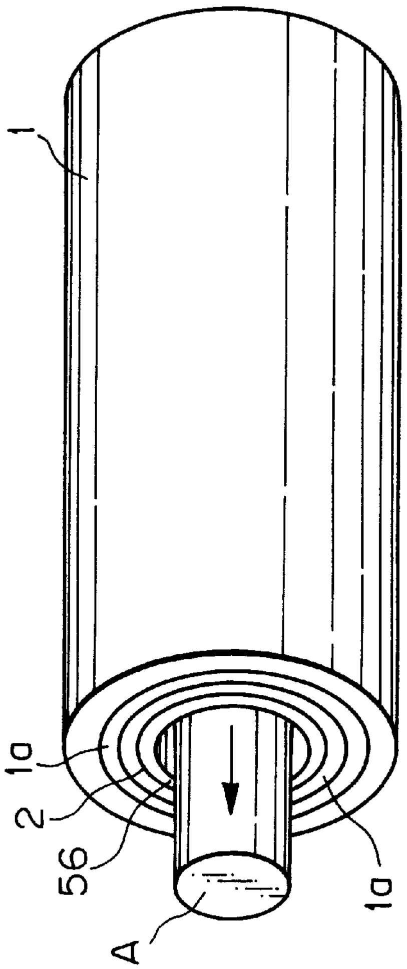
Figure 23A:
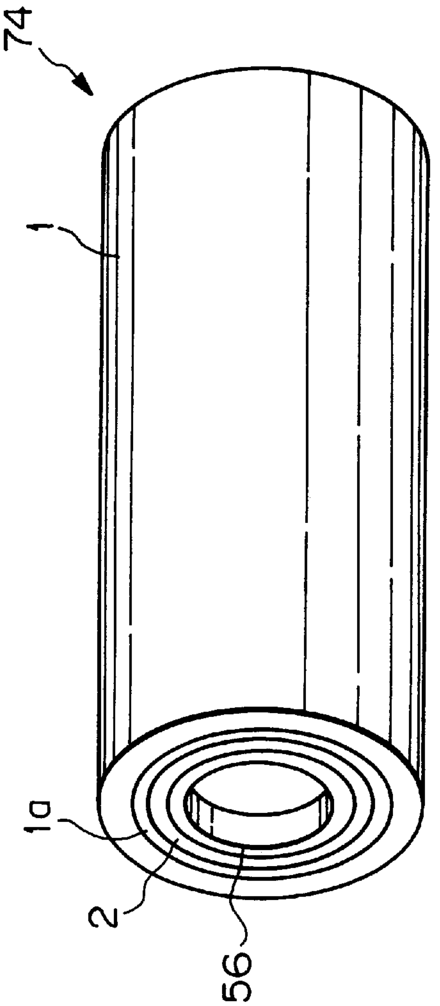

FIGS. 19A–19D demonstrate a procedure for producing the above heat roller 74. The steps shown in FIGS. 19A–19C are identical with the steps shown in FIGS. 16A–16C. As shown in FIG. 19D, an electrical insulating sheet is adhered to the outer periphery of the heating layer 2 by adhesive in order to form the insulating layer 1*a*. Subsequently, as shown in FIGS. 20A and 19B, the annular electrodes 56, heating layer 2 and insulating layer 1*a* are adhered to the mandrel A11. The mandrel with the electrodes 56, heating layer 2 and insulating layer 1*a* is inserted into the base 1. Then, as shown in FIGS. 21A and 21B, adhesive is applied to the outer periphery of the insulating layer 1*a* and then heated. At this time, the mandrel A11 expands due to heat and is firmly connected to the inner periphery of the base 1. Again, this heating step and the coefficient of thermal expansion of the mandrel A11 are set on the basis of the hardening temperature of the adhesive. The mandrel A11 is formed of a material having a greater coefficient of thermal expansion than the base 1. Thereafter, as shown in FIGS. 22A and 22B, the mandrel A11 is cooled to come off the heating layer 2 while restoring its original shape. As a result, the mandrel A11 can be pulled out with ease. FIGS. 23A and 23B show the heat roller 74 produced by the foregoing procedure.

While the parting layer is not shown in any one of FIGS. 15A, 15B, 18A and 18B, it is formed on the base 1. The parting layer may be formed before or after the heating layer, as desired.

As stated above, the insulating layer 1*a*, heating layer 2 and annular electrodes 56 can be firmly affixed to the base

1 on the basis of the coefficient of thermal expansion of the mandrel A and that of the base 1. When, the electrodes 56 formed on the heating layer 2 are implemented by copper tapes, the electrodes 56, heating layer 2 and insulating layer 1a can be formed by a series of steps.

The heat rollers shown and described each has a heating layer on the inner periphery or the outer periphery, as the case may be. Because the heating layer directly heats the hollow cylindrical base, the above heat rollers belong to a family of direct heating schemes, as distinguished from the indirect heating scheme using a halogen lamp.

The embodiments and the specific methods shown and described have various unprecedented advantages, as enumerated below.

(1) A heat roller has a heating layer evenly arranged without any gap. A fixing device with a desired resistance and desired power consumption can be constructed with ease. Because a temperature elevation time as short as 10 seconds or less is available, a heater accommodated in the heat roller can be turned on only when the device is used. This successfully reduces the power consumption of the device.

(2) A voltage can be applied to the heating layer without resorting to an expensive power source device. The device is therefore low cost and light weight.

(3) The temperature distribution of the heating layer is extremely uniform. Therefore, even when a hollow cylindrical base has a wall as thin as about 0.3 mm, the heating layer can be formed on the inner periphery of the heat roller. This reduces irregularity in temperature distribution between a sheet passing region and the other region in the axial direction of the heat roller.

(4) The heating layer or body of carbon fibers having desired power consumption can be easily formed in accordance with the shape of the heat roller. Particularly, when use is made of pitch-based carbon fibers comparable with or even greater than copper in thermal conductivity, a minimum of difference occurs in temperature between the sheet passing region and the other region.

(5). A thermal insulating layer fills the bore of the base and reduces the heat loss of the heating layer. This further reduces the temperature elevation time and makes the difference in temperature between the sheet passing region and the other region almost negligible.

(6) When the base is formed of copper or copper alloy, needless thermal loads are prevented from acting on the heating layer, insulating layer and bearings due to the high thermal conductivity of the heating layer. There can also be avoided hot offset and errors in sheet feed. In addition, the increase in power consumption due to temperature elevation at the ends of the heat roller is eliminated.

(7) Because the heat capacity of the heat roller is small, the roller heats rapidly and reduces the waiting time.

(8) Because use is made of conductive metallic tapes, the heat capacity and therefore the wear of annular electrodes is reduced. This extends the life of the heat roller. The opposite ends of each tape overlap each other and eliminates the interruption of current supply.

(9) To produce the heat roller, use is made of a mandrel having a greater coefficient of thermal expansion than the base. Therefore, the annular electrodes, heating layer and insulating layer are compressed by the mandrel and firmly affixed to the base.

Figure 24:
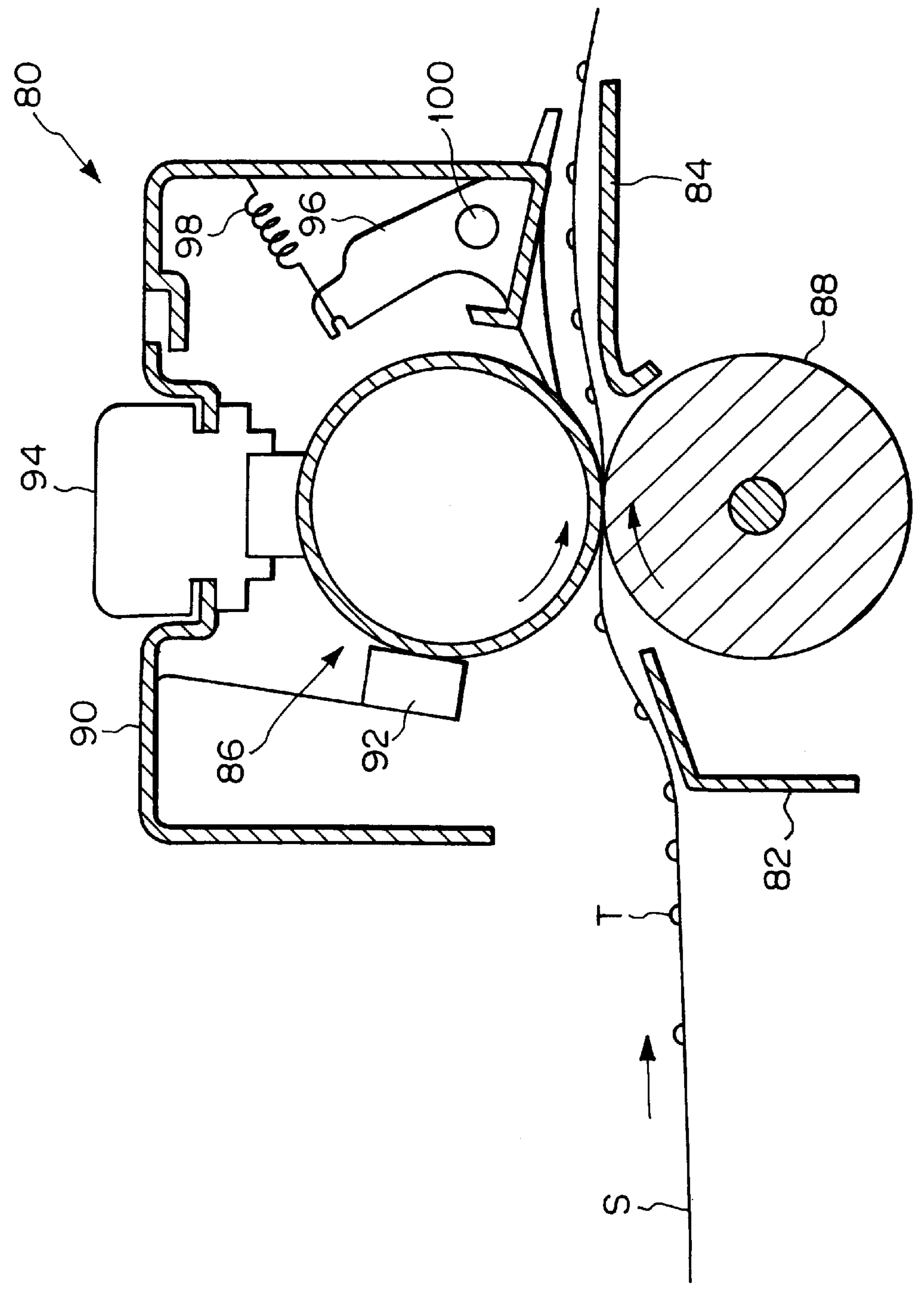
FIG. 24 is a section showing a fixing device for practicing a fifth embodiment of the present invention.

Referring to FIG. 24, a fifth embodiment of the present invention will be described. As shown, a fixing device 80 includes a heat roller 86 and a press roller 88 located at both sides of guides 82 and 84. The press roller 88 is pressed against the heat roller 86 by a spring or similar biasing member, not shown. A cover 90 accommodates a temperature sensor 92, a cleaner 94, and a sheet separator 96 in addition to the heat roller 86. A spring 98 is anchored at one end to the cover 90 and at the other end to the sheet separator 96. The sheet separator 96 is rotatable about a shaft 100 and capable of separating a sheet S from the heat roller 96. While the sheet S carrying toner T thereon is pressed by the heat roller 86 and press roller 88, the toner T is melted by heat and pressure and fixed on the sheet S thereby. It is to be noted that the mechanism surrounding the heat roller 86 and press roller 88 is only illustrative.

Figure 25A:
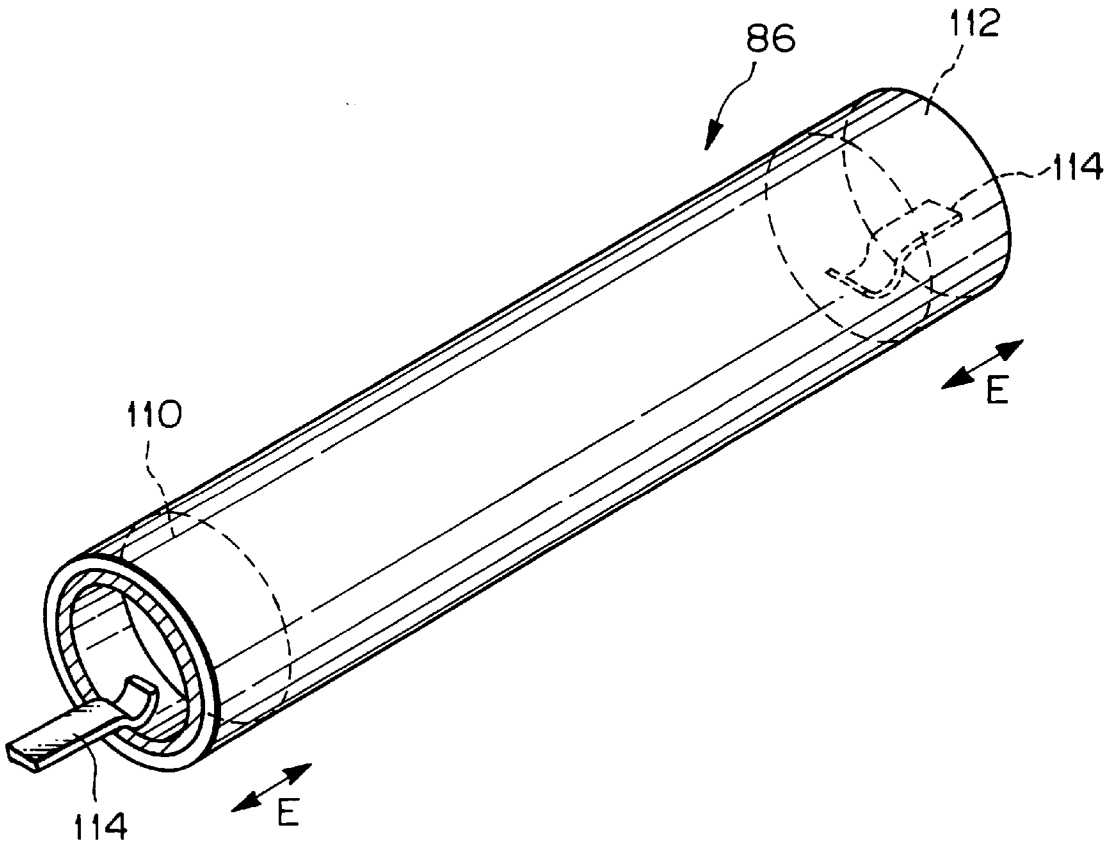
FIGS. 25A and 25B show a heat roller included in the fixing device of FIG. 24.
Figure 25B:
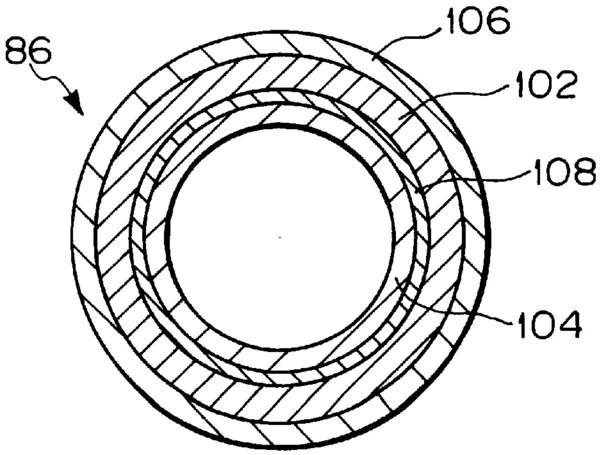

As shown in FIGS. 25A and 25B, the heat roller 86 is made up of a hollow cylindrical base 102, a heating layer 104, a parting layer 106, and an electrical insulating layer 108. The parting layer 106 covering the surface of the heat roller 86 is 5 μm to 30 μm thick and formed of fluorine-contained resin. The heating layer 104 is implemented as a hollow cylindrical member produced by molding a prepreg sheet. In the prepreg sheet, carbon fibers are impregnated with polyimide resin, bismaleimide resin, phenol resin or similar heat-resistant resin in a preselected ratio. The prepreg sheet is 0.01 mm thick to 0.5 mm thick. A binder may be applied to the carbon fibers beforehand or may be applied later in order to form the heating layer. The prepreg sheet may further contain a reinforcing material.

The base 102 is formed of aluminum and has a wall thickness of, e.g., about 0.4 mm. The insulating layer 108 is formed on the inner periphery of the base 102. These members are arranged in a tubular laminate structure, as illustrated. Electrode layers 110 and 112 are formed on both ends of the heating layer 104 and connected to the carbon fibers. As shown in FIG. 25A, the electrode layers 110 and 112 have a width E1 each, and the electrode layers 110 and 112 contact the electrode layers 110 and 112, respectively.

Figure 26:
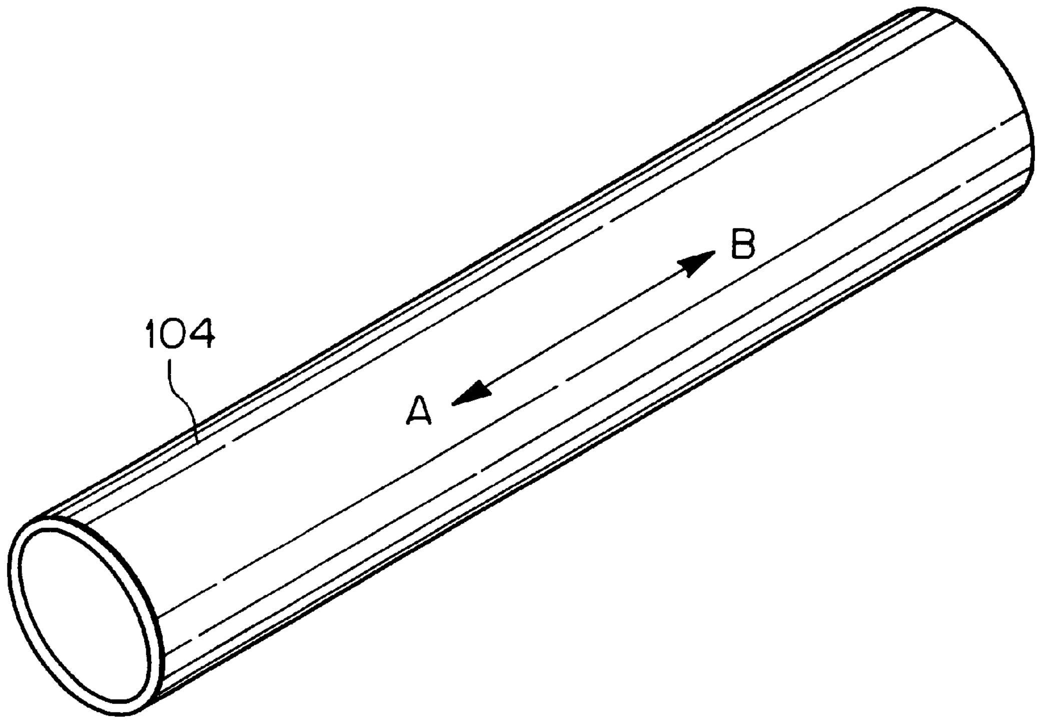
FIG. 26 is a perspective view of an electrical insulating layer included in the heat roller.

The heating layer 104 is a prepreg sheet consisting of carbon fibers and heat-resistant resin, as stated earlier. A reinforcing material is mixed with the prepreg sheet, or a reinforcing material (insulating fiber reinforced layer) is formed on the prepreg. As shown in FIG. 26, the reinforcing fibers forming the insulating fiber reinforced layer extend in a direction indicated by a double-headed arrow A-B (in the axial direction of the base 102). More specifically, the fiber reinforced prepreg sheet is cut in its lengthwise direction and wound in the direction parallel to the axis of the heat roller such that the reinforcing fibers extend in the axial direction of the base 102. For the reinforcing fibers, use may be made of aramid fibers, alumina fibers or SiC fibers. The reinforcing fibers are impregnated with polyimide resin, bismaleid resin, phenol resin or similar heat-resistant resin in a preselected ratio. The resulting prepreg sheet is 0.01 mm to 0.5 mm thick. A binder may be applied to the reinforcing fibers beforehand or later, as desired.

When SiC fibers which are conductive are used, the inner periphery of the aluminum base 102 must be subjected to Alumite processing. An Alumite layer precipitated on the surface by the Alumite processing plays the role of the electrical insulating layer 108. Of course, even when the insulating layer 108 is constituted by an insulating fiber reinforced layer, the Alumite layer may be formed on the inner periphery of the aluminum base 102. Further, the insulating layer 108 may be replaced with an Alumite layer.

Figure 27:
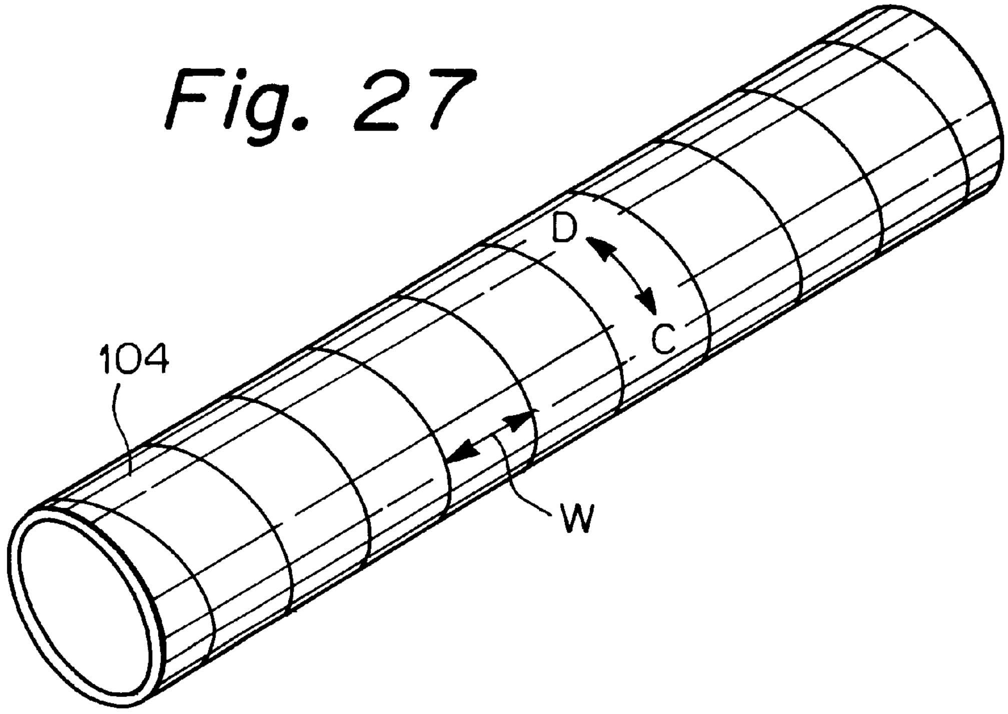
FIG. 27 is a perspective view of a heating layer also included in the heat roller.

FIG. 27 shows the direction in which the carbon fibers constituting the heating layer 104 extend. After the insulating layer 108 implemented by an Alumite layer or by the insulating fiber reinforced layer has been formed on the inner periphery of the base 102, the heating layer 104 is formed on the inner periphery of the layer 108. Alternatively, the heating layer 104 is molded integrally with the insulating layer 108. As shown in FIG. 27, the carbon fiber prepreg sheet cut in a rectangular shape having a width W is wrapped helically around the inner periphery of the insulating layer (insulating reinforced layer) 108, FIG. 16. The fibers of the prepreg sheet extends in a direction indicated by a double-headed arrow C-D. Therefore, the fibers of the reinforced layer extend across the carbon fibers, increasing the strength of the heat roller 86. This allows the wall thickness of the base 102 to be reduced.

By varying the width of the prepreg, it is possible to vary the electric resistance and the amount of heat to be generated by the heat roller 86. The carbon fibers may contain reinforcing fibers in a preselected ratio, if desired. Of course, after the prepreg having carbon fibers laminated on an insulating fiber reinforced composite material has been formed, the insulating layer side of the prepreg may be brought into contact with the inner periphery of the base 102 and then heated. In this case, the conductive surface of the prepreg will play the role of the heating layer 104.

As shown in FIG. 25A, to form the electrode layers 110 and 112, conductive members are respectively press-fitted on the inner periphery of the heating layer 104 at opposite ends, and each extends over the range E mentioned earlier. The feed electrodes 114 are each pressed against the associated electrode layer 110 or 112 by a leaf spring.

Figure 28:
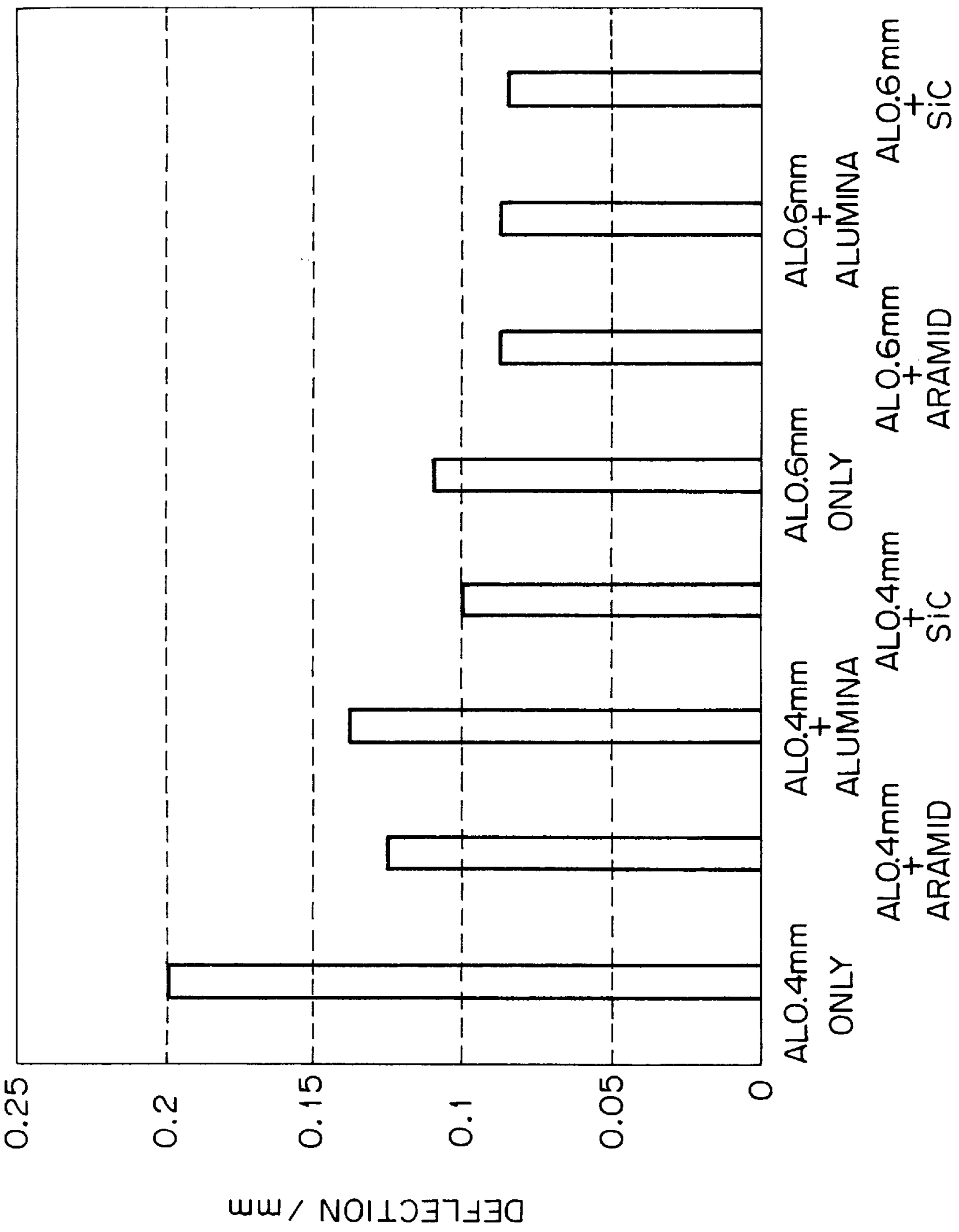
FIG. 28 shows reinforcement against deflection particular to the fifth embodiment.

Reference will be made to FIG. 28 for describing the deflection strength of the heat roller 86. In FIG. 28, the ordinate and abscissa indicate deflection strength and the material of the heat roller 86, respectively. As shown, the second heat roller from the left, for example, has a 0.4 mm thick aluminum base 102 and a heating layer 104 with aramid fibers for reinforcement. The deflection was measured by pressing the heat roller 88 against the press roller 86 by 30N at one side. As FIG. 28 indicates, even when the wall thickness of the aluminum base 102 is extremely close to 0.4 mm, the heat roller 86 is as strong as a heat roller whose aluminum base has a wall thickness of 0.6 mm.

Figure 29:
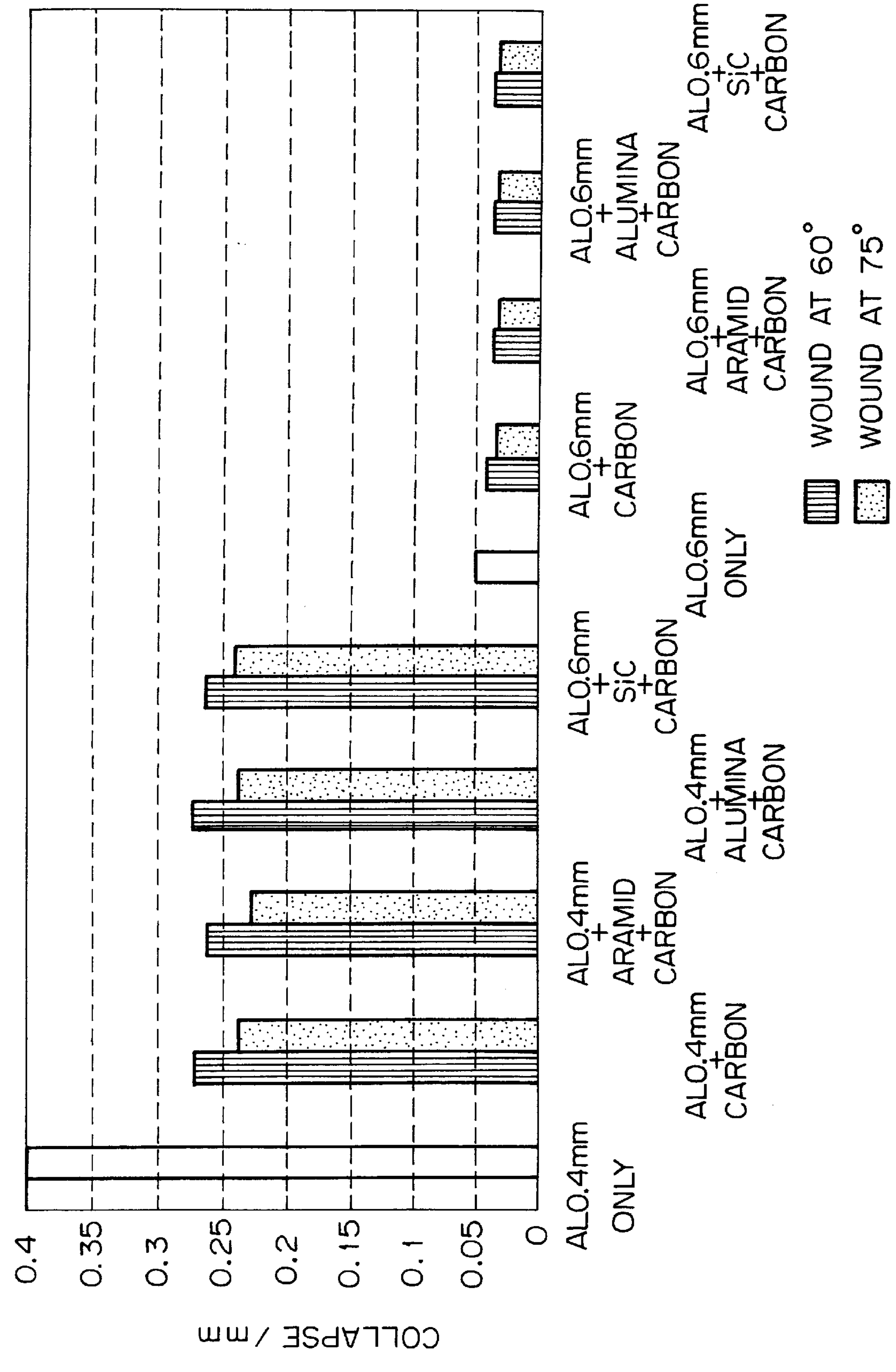
FIG. 29 shows reinforcement against collapse also particular to the fifth embodiment.

FIG. 29 shows the collapse strength of the heat roller 86 with respect to different angles of 60° and 75° at which the carbon fibers of the prepreg sheet may be wound with respect to the axial direction of the roller 86. In FIG. 29, the ordinate and abscissa indicate collapse strength (collapse/mm) and the material of the heat roller 86, respectively. As shown, the third heat roller from the left, for example, has a 0.4 mm thick aluminum base 102 and aramid fibers playing the role of a reinforcing material. As FIG. 29 indicates, although the heat roller 86 is slightly inferior to a heat roller whose aluminum base is 0.6 mm thick, it achieves a greater reinforcing effect than when including the aluminum base alone (0.4 mm thick). In this manner, the heat roller 86 achieves sufficient strength and is free from deflection or collapse when it is pressed, preventing image quality from being lowered by fixation.

Figure 30:
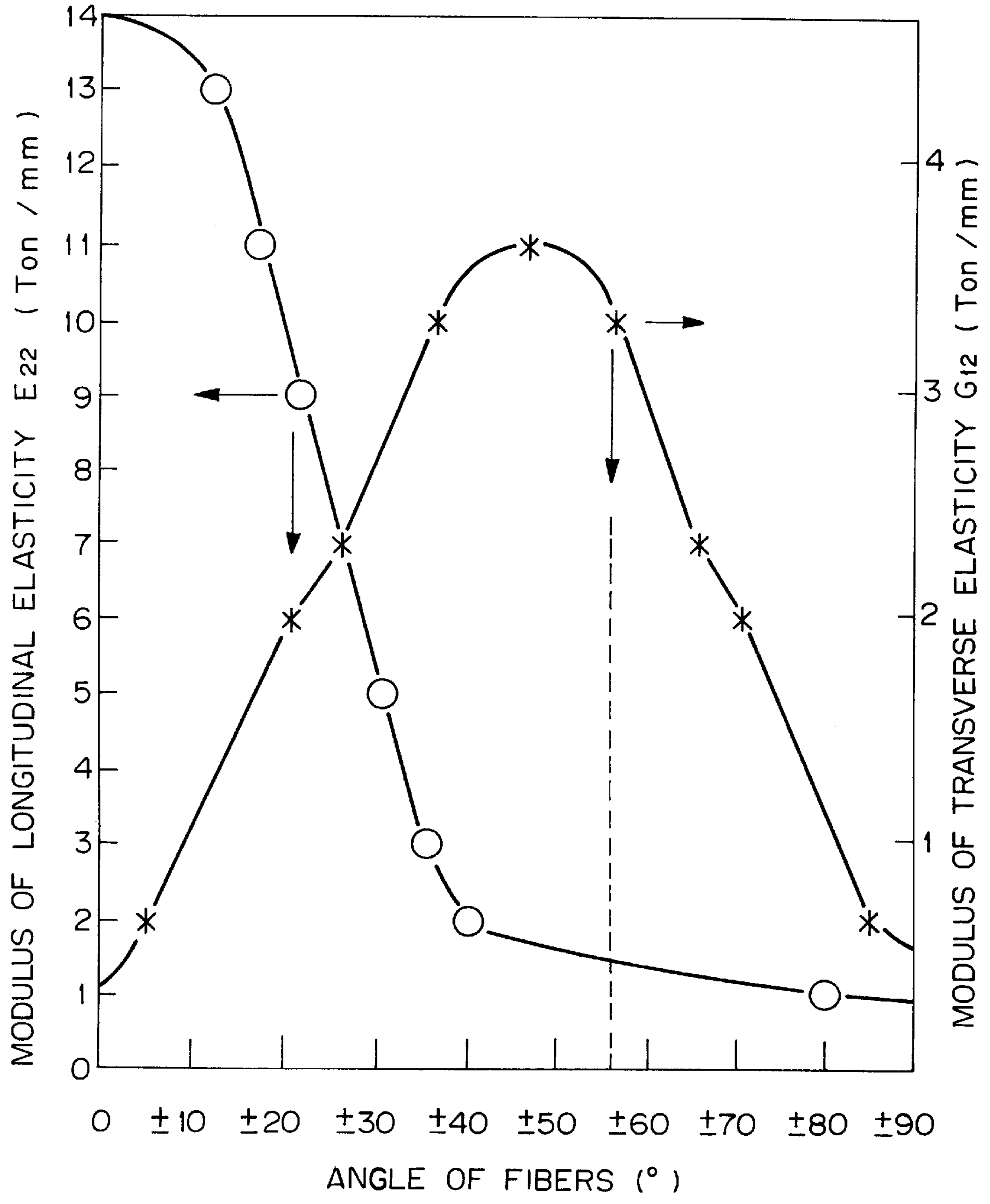
FIG. 30 shows anisotropy particular to a fiber reinforced composite material applicable to the fifth embodiment.

FIG. 30 shows a relation between the angle at which the heating layer 104 of carbon fibers is wound with respect to the axial direction of the heat roller 86, the modulus of transverse elasticity $G_{12}$, and the modulus of longitudinal elasticity $E_{22}$. With the relation shown in FIG. 30, it is possible to set the modulus of elasticity of the heat roller 86 easily in accordance with the angle of the prepreg.

As FIG. 30 indicates, when the prepreg sheet constituting the heating layer 104 is wound at an angle of 60° or above with respect to the axial direction of the heat roller 86, the roller 86 achieves high collapse strength. This means that the winding angle of the prepreg sheet is important in maintaining the strength of the heat roller 86. The fiber reinforced material provides the heat roller 86 with high deflection strength when its fibers are oriented in the axial direction of the base. The reinforcing fibers and carbon fibers are caused to intersect each other because the fiber reinforced composite material is highly anisotropic.

Figure 31:
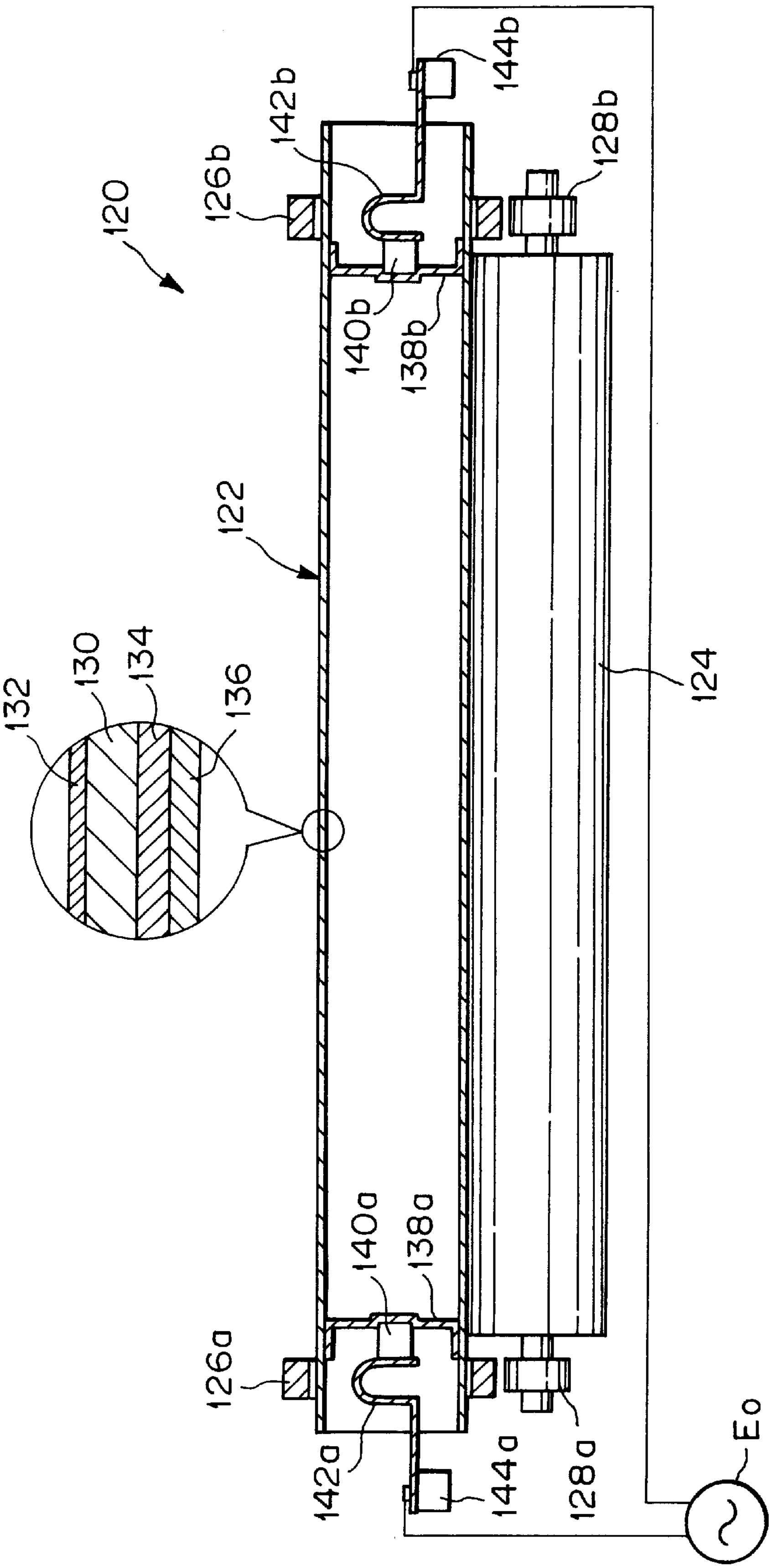
FIG. 31 is a partly taken away sectional view of a fixing device for practicing a sixth embodiment of the present invention.
Figure 32:
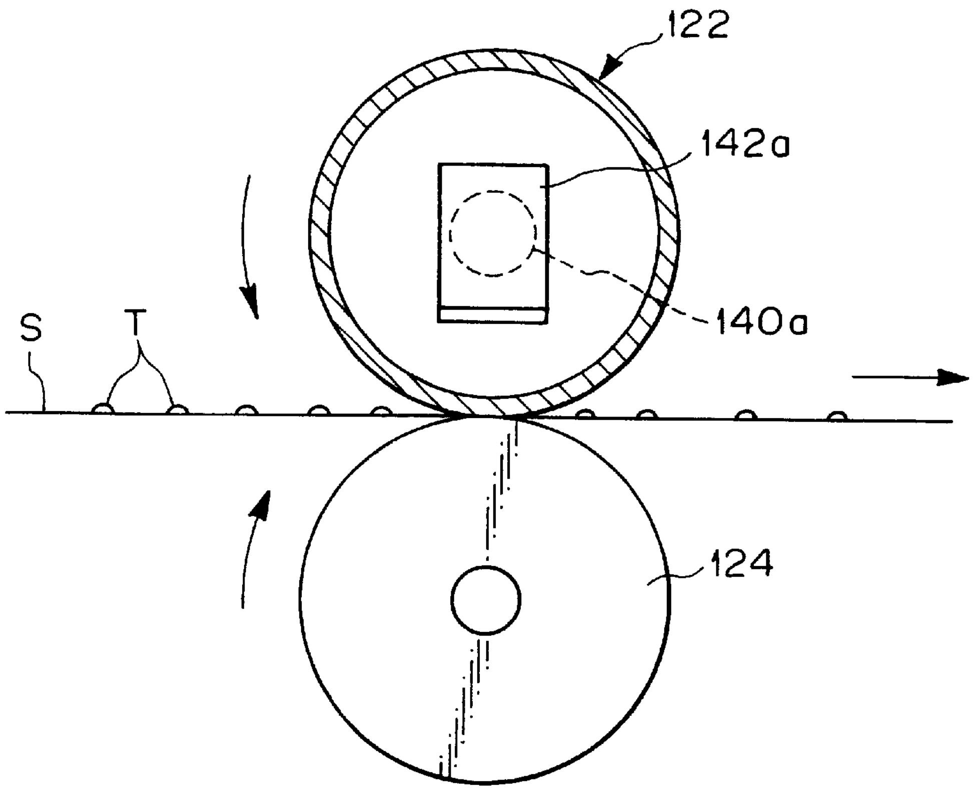
FIG. 32 is a side elevation of a heat roller and a press roller shown in FIG. 31.

Referring to FIG. 31, a fixing device 120 and a heat roller 122 representative of a sixth embodiment of the present invention are shown. As shown, the fixing device 120 has a press roller 124 in addition to the heat roller 122. The press roller 124 is pressed against the heat roller 122 by a spring or similar biasing means, not shown, under a preselected pressure. The heat roller 122 is rotatably supported via opposite bearings 126*a* and 126*b* and rotated at a preselected speed by a drive mechanism, not shown. The press roller 124 is also rotatably supported via bearings 128*a* and 128*b* and rotated by the heat roller 122. As shown in FIG. 32, while a sheet S carrying toner T thereon is pased through a nip between the heat roller 122 and the press roller 124, the toner T is melted by heat and pressure and fixed on the sheet S thereby.

Figure 33:
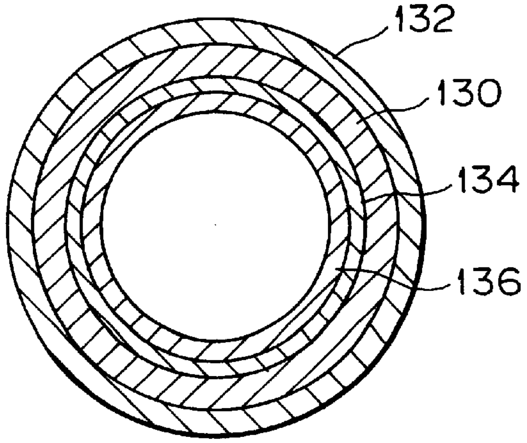
FIG. 33 is a section of the heat roller.

As shown in FIGS. 31 and 33, the heat roller 122 includes a hollow cylindrical base 130 formed of aluminum and has a wall thickness of, e.g., 0.4 mm. A parting layer 132 of fluorine-contained resin is formed on the base 130 and 5 $\mu$m to 30 $\mu$m thick. An electrical insulating layer 134 is formed on the inner periphery of the parting layer 134. A heating layer or resistance body 136 constituted by carbon fibers is formed on the inner periphery of the insulating layer 134.

The insulating layer 134 is implemented by Alumite or by aramid fibers, alumina fibers, SiC fibers or similar insulating reinforcing fibers, as in the fifth embodiment. When use is made of Alumite, the insulating layer 134 is caused to precipitate as an Alumite layer on the inner periphery of the base 130. When use is made of the insulating reinforcing fibers, a 0.01 mm to 0.5 mm prepreg sheet or composite material in which the reinforcing fibers are impregnated with the heat-resistant resin is molded and oriented as described with reference to FIG. 26. Again, when the SiC fibers are used, the inner periphery of the base 130 must be subjected to Alumite processing. Of course, even when reinforcing fibers other than SiC fibers are used, Alumite processing may be applied to the inner periphery of the base 130.

The heating layer 136 is a 0.01 mm to 0.5 mm prepreg sheet consisting of carbon fibers, or resistance body, impregnated with phenol resin or similar heat-resistant resin in a preselected ratio. The heating layer 136 is formed after the insulating layer 134 has been formed on the inner periphery of the base 130, or it is molded integrally with the insulating layer 134. The configuration of the prepreg sheet is the same as described with reference to FIG. 27.

As FIGS. 26 and 27 indicate, the insulating layer 134 and heating layer 136 have their fibers intersecting each other (directions A-B and D-C) at the preselected angle. This increases the strength of the heat roller 122 and thereby allows the wall thickness of the base 130 to be reduced. Experiments showed that the above intersecting angle should preferably be 60° C. or above.

As shown in FIG. 31, disk-like electrodes 138*a* and 138*b* are positioned in and at opposite ends of the heat roller 122. Conductive brushes 140*a* and 140*b* are respectively affixed to the center of the electrode 138*a* and that of the electrode 138*b*. Electrodes 142*a* and 142*b* are respectively pressed against the ends of the conductive brushes 140*a* and 140*b*. The electrodes 142*a* and 142*b* are each implemented as a flat conductive resilient member having a U-shaped end. If desired, only the U-shaped end of each electrode 142*a* or

142*b* may be formed of a resilient material. The electrodes 142*a* and 142*b* are respectively connected to insulating terminal supports 144*a* and 144*b* outside of the heat roller 122. A power source $E_o$ is connected to the terminal supports 144*a* and 144*b*.

Figure 34A:
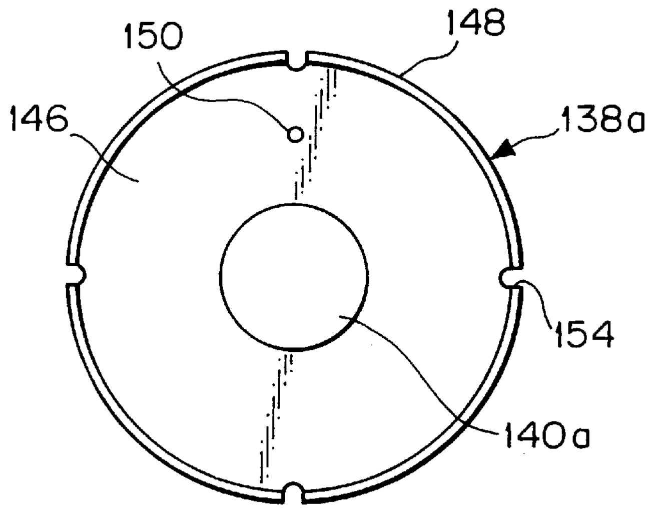
FIGS. 34A and 34B show an electrode for receiving a voltage.
Figure 34B:
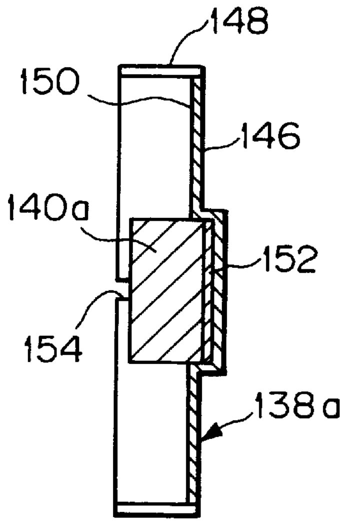
Figure 35:
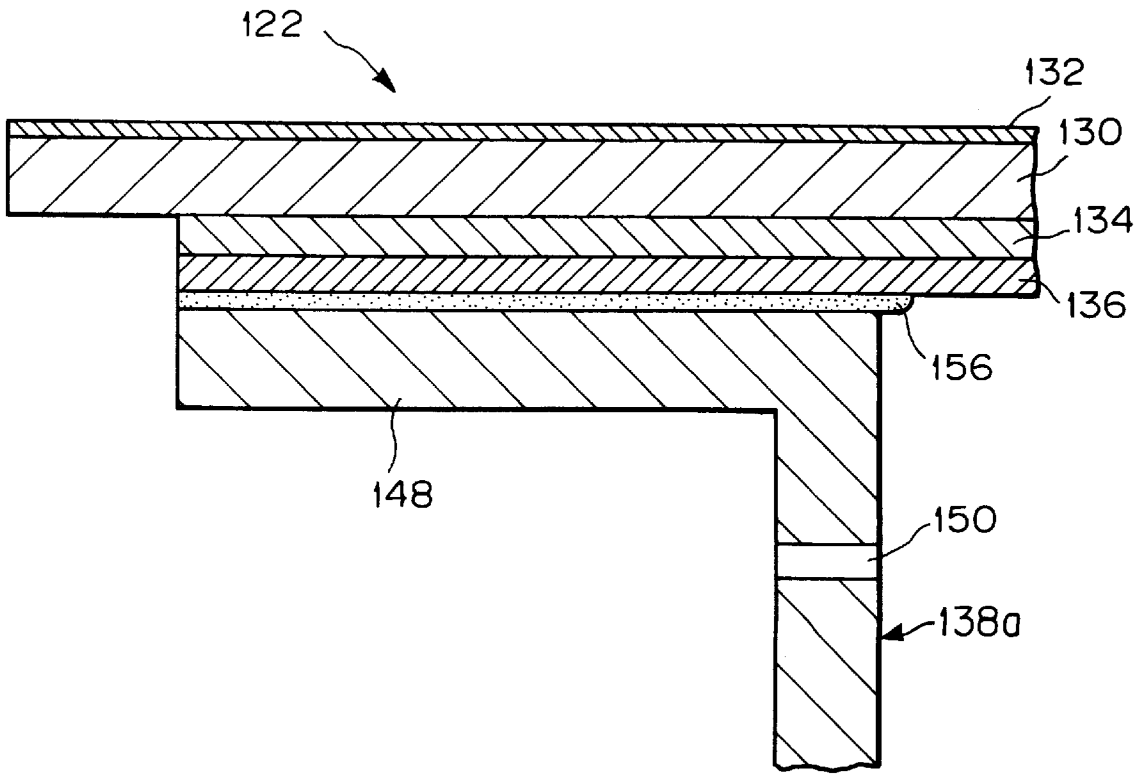
FIG. 35 is an enlarged section showing a portion where the electrode joins the heat roller.

FIGS. 34A and 34B show the configuration of the disk-like electrode 138*a* while FIG. 35 shows the connection of the electrode 138*a* to the heat roller 122. The other disk-like electrode 138 is identical in configuration with the electrode 138*a* and will not be described in order to avoid redundancy.

As shown in FIGS. 34A and 34B, the electrode 138*a* has a disk portion 146 and a circumferential wall portion 148 protruding from the disk portion 146. An air vent in the form of a hole 150 is formed in any desired position of the disk portion 146. The brush 140*a* is affixed to the center of the disk portion 146 by conductive adhesive 152. Notches 154 are formed in the circumferential wall portion 148 in order to provide the wall portion 148 with resiliency. When the electrode 138*a* is inserted in the heat roller 122, the elastic wall portion 148 makes tight contact with the inner periphery of the roller 122.

As shown in FIG. 35, after the electrode 138*a* has been inserted into one end of the heat roller 122, it is affixed to the cylindrical portion of the roller 122 by conductive adhesive 156 filling the gap between the wall portion 148 and the inner surface of the roller 122.

The fixing device 120 will be operated, as follows. When the device 120 should be used, the power source $E_o$ is turned on to apply a voltage to the electrodes 142*a* and 142*b*. When the heat roller 122 is rotated, the electrodes 138*a* and 138*b* affixed to the roller 122 also rotate. In this condition, the conductive brushes 140*a* and 140*b* rotate while sliding on and being held in electrical contact with the electrodes 142*a* and 142*b*, respectively. As a result, a current is fed to the heating layer 136 of the heat roller 122 via the electrodes 142*a* and 142*b*, brushes 140*a* and 140*b*, and electrodes 138*a* and 138*b*. In response, the heating layer 136 generates Joule heat corresponding to its resistance and heats the entire surface of the heat roller 122 to a preselected temperature.

The brushes 140*a* and 140*b* are respectively affixed to the center of rotation of the electrode 138*a* and that of the electrode 138*b*. Therefore, the electrodes 142*a* and 142*b* respectively contact the brushes 140*a* and 140*b* at positions where the relative velocity is lowest. This extends the life of the brushes 140*a* and 140*b* and electrodes 142*a* and 142*b*, compared to a case wherein the electrodes 142*a* and 142*b* are located at other positions. In addition, because the electrodes 142*a* and 142*b* are flat elastic members, they are constantly pressed against the ends of the brushes 140*a* and 140*b* under a preselected pressure, and therefore free from defective contact.

Moreover, the electrodes 138*a* and 138*b* and electrodes 142*a* and 142*b* are disposed in the heat roller 122. Therefore, even when a spark is produced due to defective contact, it does not endanger a sheet or surrounding parts.

In addition, the disk-like electrodes 138*a* and 138*b* are affixed to the inner periphery of the heat roller 122 while contacting it over the entire circumference. The electrodes 138*a* and 138*b* therefore serve to reinforce the heat roller 122 against deflection and collapse. This also allows the wall thickness of the heat roller 122 to be reduced.

In the illustrative embodiment, the conductive brushes 140*a* and 140*b* are formed of carbon and mounted on the electrodes 138*a* and 138*b*. If desired, the brushes 140*a* and 140*b* may be mounted on the electrodes 142*a* and 142*b* or on both the electrodes 138*a* and 138*b* and electrodes 142*a* and 142*b*.

In summary, the fifth and sixth embodiments described above have the following advantages.

(1) Use is made of a hollow cylindrical base having a small heat capacity and a thin wall. An electrical insulating layer and a heating layer having electric resistance are laminated on the inner periphery of the base. A parting layer is formed on the outer periphery of the base. This kind of configuration enhances the strength of the base. In addition, the surface temperature of a heat roller rises to a preselected temperature rapidly, reducing the waiting time and power consumption.

(2) The heating layer provided in the base together with the insulating layer is constituted by carbon fibers. This increases the specific strength and specific modulus of elasticity of the entire heat roller and prevents the strength of the roller from falling. As a result, the heat roller can have its wall thickness and overall size reduced.

(3) The heat roller is prevented from bending over an allowable limit relative to its axis or collapsing in its radial direction despite a pressure to be exerted by a press roller. This allows a minimum of defective fixation to occur (4) The parting layer formed on the surface of the aluminum base has a smooth surface, so that an adequate surface roughness is achievable with ease when the parting layer is formed. Because the parting layer is directly formed on the outer periphery of the base, the heat roller is resistive to peeling and wear and can be safely used over a long period of time.

(5) To form the parting layer, a conventional method and apparatus for the production of a heat roller are usable without any modification. In addition, the heat roller can be produced stably with high quality.

(6) The heating layer is formed on the inner periphery of the aluminum base and therefore extremely safe; otherwise, the heating layer would be exposed to the outside due to wear or peeling of the parting layer and would generate a spark due to defective contact. In addition, because the heating layer and power feeding means are positioned within the heat roller, a spark, if generated due to overheat or defective contact, does not cause a sheet or surrounding parts to catch fire. This is also true when the temperature is elevated to an unusual degree.

(7) Because electrodes are elastic, they are free from defective contact although they may wear due aging.

(8) Because electrodes contacting each other are aligned with the center of rotation of the heat roller, the relative speed of a conductive brush and the electrode contacting it can be reduced in order to minimize the wear of the sliding portions.

(9) The electrodes mounted on the heat roller are in the form of disks disposed in and affixed to opposite ends of the heating layer. The disks reinforce the heat roller against deflection and collapse. This allows the wall thickness of the base, i.e., the wall thickness of the heat roller to be reduced.

Various modifications will become possible for those skilled in the art after receiving the teachings of the present disclosure without departing from the scope thereof.

What is claimed is:

1. A method of producing a fixing roller, comprising the steps of:

(a) preparing a cylindrical mandrel;

(b) temporarily adhering annular electrodes each comprising conductive tape to opposite ends of said mandrel with respect to an axial direction of said mandrel;

(c) winding a resistance body, in a form of a sheet constituted by strip-like fibers, around said mandrel and annular electrodes, said resistance body constituting a heating layer;

(d) inserting said mandrel with said annular electrodes and wound with said resistance body into a bore of a base and heating said mandrel; and (e) pulling out said mandrel so as to so to leave said annular electrodes wound with said resistance body in said bore of said base.

2. The method of claim 1, further comprising:

providing a resistance R of said resistance body and a heating area W·L of said heating layer for implementing a desired power, so as to satisfy the following expression:

$$R=Rs\cdot L/W$$

$$W\cdot L=2\pi Rl$$

where Rs, L and W respectively denote a surface resistance, a length and a width of said resistance body, π denotes a ratio of a circumference of a circle to a diameter, r denotes a radius of said heating layer, and l denotes a length of said heating layer in an axial direction of said mandrel.

3. The method of claim 1, further comprising:

providing said strip-like fibers of said resistance body as carbon fibers.

4. The method of claim 1, further comprising:

providing said strip-like fibers of said resistance body as pitch-based carbon fibers.

5. The method of claim 1, further comprising:

forming said base of one of copper and copper alloy.

6. The method of claim 1, wherein said step (e) of pulling out said mandrel results in forming said heating layer on an inner periphery of said base.

7. The method of claim 1, wherein said step (b) of temporarily adhering annular electrodes comprises providing each of said conductive tape so that one end of each of said conductive tape underlies with the other end thereof.

8. The method of claim 1, further comprising:

providing a thermal insulating material comprising one of a foam structure and a porous structure so as to fill said bore of said base.

9. The method of claim 1, further comprising:

providing said resistance body so as to extend helically or linearly in an axial direction of said mandrel and said stip-like fibers so as to intersect said axial direction at an angle θ, so as to satisfy the following expression:

$$\theta=\cos^{-1}(lRs/2\pi rR)^{1/2}$$

where l denotes a length of said heating layer in said axial direction, Rs denotes a surface resistance of said resistance body, r denotes a ratio of a circumference of a circle to a diameter, r denotes a radius of said heating layer, and R denotes a resistance of said heating body.

10. The method of claim 1, further comprising:

providing said base made of aluminum with an Alumite layer precipitated on an inner periphery thereof serving as an insulating layer.

11. The method of claim 1, further comprising:

providing said base with an insulating layer formed of a fiber reinforced composite material oriented in one direction and arranged in a same direction as an axial direction of said base;

providing said heating layer as a one-directional carbon fiber prepreg consisting of carbon fibers impregnated with heat-resistant resin; and molding said prepreg by heat on an inner periphery of said insulating layer and so as to extend helically in said axial direction of said base.

12. The method of claim 1, further comprising:

providing said base with an insulating layer formed of a fiber reinforced composite material selected from a group of heat-resistant fibers including aramid fibers, alumina fibers, and conductive SiC fibers; and providing said heating layer as a carbon fiber prepreg in a form of a mixture of carbon fibers and a fiber reinforced composite material.

13. The method of claim 11, further comprising:

providing fibers of said fiber reinforced composite material forming said insulating layer so as to extend in a same direction as an axial direction of said base, while carbon fibers forming said heating layer intersect said fibers of said fiber reinforced composite material.

14. The method of claim 12, further comprising:

providing fibers of said fiber reinforced composite material forming said insulating layer so as to extend in a same direction as an axial direction of said base, while carbon fibers forming said heating layer intersect said fibers of said fiber reinforced composite material.

* * * * *